(12) United States Patent
Partovi

(10) Patent No.: US 8,890,470 B2
(45) Date of Patent: *Nov. 18, 2014

(54) SYSTEM FOR WIRELESS POWER TRANSFER THAT SUPPORTS INTEROPERABILITY, AND MULTI-POLE MAGNETS FOR USE THEREWITH

(75) Inventor: Afshin Partovi, Sunnyvale, CA (US)

(73) Assignee: Mojo Mobility, Inc., Santa Clara, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 13/158,134

(22) Filed: Jun. 10, 2011

(65) Prior Publication Data

US 2012/0146576 A1 Jun. 14, 2012

Related U.S. Application Data

(60) Provisional application No. 61/354,114, filed on Jun. 11, 2010, provisional application No. 61/387,895, filed on Sep. 29, 2010, provisional application No. 61/478,015, filed on Apr. 21, 2011.

(51) Int. Cl.
| | |
|---|---|
| *H01F 38/14* | (2006.01) |
| *H02J 5/00* | (2006.01) |
| *H01F 7/02* | (2006.01) |
| *H02J 7/00* | (2006.01) |

(52) U.S. Cl.
CPC . *H02J 7/00* (2013.01); *H02J 5/005* (2013.01); *H01F 7/0252* (2013.01); *H01F 7/0247* (2013.01)
USPC .......................................................... 320/108

(58) Field of Classification Search
USPC .......................................................... 320/108
See application file for complete search history.

(56) References Cited

U.S. PATENT DOCUMENTS

| | | | |
|---|---|---|---|
| 3,938,018 A | 2/1976 | Dahl | |
| 4,311,853 A | 1/1982 | Cree | |

(Continued)

FOREIGN PATENT DOCUMENTS

| | | |
|---|---|---|
| JP | 2000341885 | 8/2000 |
| JP | 2003045731 | 2/2003 |

(Continued)

OTHER PUBLICATIONS

Sakamoto, et al., "A Novel Circuit for Non-Contact Charging Through Electro-Magnetic Coupling", 1992, IEEE, pp. 165-174.

(Continued)

*Primary Examiner* — Samuel Berhanu
*Assistant Examiner* — Jerry D Robbins
(74) *Attorney, Agent, or Firm* — Meyer IP Law Group

(57) ABSTRACT

In the field of wireless power, to enable interoperability between chargers and receivers, it is important that the two parts of the system (the charger and receiver) can communicate in a manner that allows operation. With the proliferation of different communication schemes, a multi-protocol system that can adapt and interoperate with different communication protocols allows maximum interoperability. Described herein are systems and methods for providing such multi-protocol operation and maximum interoperability. Also described herein are methods for use of magnets in or around magnetically sensitive devices such that the operation of such a device is not impaired. Applications in various devices and systems are described. In particular, applications for fastening mobile devices to their cases or other surfaces, and also alignment or attachment for power transfer or charging are described.

28 Claims, 18 Drawing Sheets

(56) References Cited

U.S. PATENT DOCUMENTS

| | | |
|---|---|---|
| 4,311,953 A | 1/1982 | Fukuda |
| 4,415,959 A | 11/1983 | Vinciarelli |
| 4,731,585 A | 3/1988 | Fox |
| 4,800,328 A * | 1/1989 | Bolger et al. ................ 320/106 |
| 4,873,677 A | 10/1989 | Sakamoto |
| 5,237,257 A | 8/1993 | Johnson et al. |
| 5,311,973 A | 5/1994 | Tseng |
| 5,367,242 A * | 11/1994 | Hulman ....................... 320/108 |
| 5,434,493 A | 7/1995 | Woody |
| 5,543,702 A | 8/1996 | Pfeiffer |
| 5,550,452 A | 8/1996 | Shirai |
| 5,600,225 A | 2/1997 | Goto |
| 5,642,087 A | 6/1997 | Crow |
| 5,656,917 A | 8/1997 | Theobald |
| 5,696,433 A | 12/1997 | Patino |
| 5,734,254 A | 3/1998 | Stephens |
| 5,744,933 A | 4/1998 | Inoue |
| 5,889,384 A | 3/1999 | Hayes |
| 5,925,814 A | 7/1999 | Tsuzuki |
| 5,952,814 A | 9/1999 | Van Lerbergne |
| 5,959,433 A | 9/1999 | Rohde |
| 5,963,012 A | 10/1999 | Garcia |
| 5,991,170 A | 11/1999 | Nagai |
| 5,991,665 A | 11/1999 | Wang et al. |
| 6,008,622 A | 12/1999 | Nakawatase |
| 6,016,046 A | 1/2000 | Kaite |
| 6,040,680 A | 3/2000 | Toya |
| 6,094,119 A | 7/2000 | Reznik et al. |
| 6,184,651 B1 | 2/2001 | Fernandez |
| 6,184,654 B1 | 2/2001 | Bachner |
| 6,208,115 B1 | 3/2001 | Binder |
| 6,301,128 B1 | 10/2001 | Jang |
| 6,310,465 B2 | 10/2001 | Najima |
| 6,331,744 B1 | 12/2001 | Chen |
| 6,436,299 B1 | 8/2002 | Baarman |
| 6,462,509 B1 | 10/2002 | Abe |
| 6,489,745 B1 | 12/2002 | Koreis |
| 6,498,455 B2 | 12/2002 | Zink et al. |
| 6,501,364 B1 | 12/2002 | Hui |
| 6,573,817 B2 | 6/2003 | Gottschalk |
| 6,586,909 B1 | 7/2003 | Trepka |
| 6,625,477 B1 | 9/2003 | Wakefield |
| 6,636,017 B2 | 10/2003 | Zink et al. |
| 6,650,088 B1 | 11/2003 | Webb |
| 6,673,250 B2 | 1/2004 | Kuennen |
| 6,697,272 B2 | 2/2004 | Nanbu |
| 6,731,071 B2 | 5/2004 | Baarman |
| 6,741,064 B2 | 5/2004 | Liu |
| 6,756,765 B2 | 6/2004 | Bruning |
| 6,798,716 B1 | 9/2004 | Charych |
| 6,803,744 B1 | 10/2004 | Sabo |
| 6,803,774 B2 | 10/2004 | Park |
| 6,806,649 B2 | 10/2004 | Mollema |
| 6,812,645 B2 | 11/2004 | Baarman |
| 6,825,620 B2 | 11/2004 | Kuennen |
| 6,831,417 B2 | 12/2004 | Baarman |
| 6,844,702 B2 | 1/2005 | Giannopoulos et al. |
| 6,870,089 B1 | 3/2005 | Gray |
| 6,888,438 B2 | 5/2005 | Hui |
| 6,906,495 B2 | 6/2005 | Cheng |
| 6,913,477 B2 | 7/2005 | Dayan |
| 6,917,163 B2 | 7/2005 | Baarman |
| 6,917,182 B2 | 7/2005 | Burton |
| 6,943,733 B2 | 9/2005 | Vance |
| 6,972,543 B1 | 12/2005 | Wells |
| 6,975,198 B2 | 12/2005 | Baarman |
| 7,026,789 B2 | 4/2006 | Bozzone |
| 7,031,662 B2 | 4/2006 | Suzuki |
| 7,042,196 B2 | 5/2006 | Ka-Lai et al. |
| 7,116,200 B2 | 10/2006 | Baarman |
| 7,118,240 B2 | 10/2006 | Baarman |
| 7,126,450 B2 | 10/2006 | Baarman |
| 7,132,918 B2 | 11/2006 | Baarman |
| 7,151,357 B2 * | 12/2006 | Xian et al. .................... 320/108 |
| 7,162,264 B2 | 1/2007 | Vance |
| 7,164,245 B1 | 1/2007 | Chen |
| 7,164,255 B2 | 1/2007 | Hui |
| 7,183,870 B2 | 2/2007 | Takagi |
| 7,184,706 B2 | 2/2007 | Someya |
| 7,209,084 B2 | 4/2007 | Lindell |
| 7,211,986 B1 | 5/2007 | Flowerdew et al. |
| 7,221,919 B2 | 5/2007 | Takagi |
| 7,239,110 B2 | 7/2007 | Cheng et al. |
| 7,248,017 B2 | 7/2007 | Cheng et al. |
| 7,305,258 B2 | 12/2007 | Rydgren |
| 7,311,526 B2 | 12/2007 | Rohrbach |
| 7,324,051 B2 | 1/2008 | Hayes |
| 7,342,539 B2 | 3/2008 | Rosenberg |
| 7,352,567 B2 | 4/2008 | Hotelling |
| 7,355,150 B2 | 4/2008 | Baarman |
| 7,376,408 B2 | 5/2008 | Hayes |
| 7,378,817 B2 | 5/2008 | Calhoon et al. |
| 7,382,636 B2 | 6/2008 | Baarman |
| 7,385,357 B2 | 6/2008 | Kuennen |
| 7,388,543 B2 | 6/2008 | Vance |
| 7,399,202 B2 | 7/2008 | Dayan |
| 7,415,248 B2 | 8/2008 | Andersson |
| 7,443,135 B2 | 10/2008 | Cho |
| 7,462,951 B1 | 12/2008 | Baarman |
| 7,477,195 B2 | 1/2009 | Vance |
| 7,487,921 B2 | 2/2009 | Takahashi |
| 7,495,414 B2 | 2/2009 | Hui |
| 7,498,871 B2 | 3/2009 | Ruuswik |
| 7,525,283 B2 | 4/2009 | Cheng et al. |
| 7,554,316 B2 * | 6/2009 | Stevens et al. ................ 323/355 |
| 7,576,514 B2 | 8/2009 | Hui |
| 7,605,496 B2 | 10/2009 | Stevens et al. |
| D603,603 S | 11/2009 | Laine et al. |
| D607,879 S | 1/2010 | Ferber et al. |
| 7,645,143 B2 | 1/2010 | Rohrbach |
| D611,407 S | 3/2010 | Webb |
| D611,408 S | 3/2010 | Ferber et al. |
| 7,741,734 B2 | 6/2010 | Joannopoulos et al. |
| 7,781,916 B2 | 8/2010 | Boys |
| D624,316 S | 9/2010 | Ferber et al. |
| 7,804,054 B2 | 9/2010 | Shalom |
| D625,721 S | 10/2010 | Ferber et al. |
| 7,825,543 B2 | 11/2010 | Karalis et al. |
| 7,855,529 B2 | 12/2010 | Liu |
| 7,872,445 B2 | 1/2011 | Hui |
| 7,906,936 B2 | 3/2011 | Azancot et al. |
| 7,915,858 B2 * | 3/2011 | Liu et al. ...................... 320/108 |
| D636,333 S | 4/2011 | Kulikowski |
| D639,734 S | 6/2011 | Ferber et al. |
| 8,035,255 B2 | 10/2011 | Kurs et al. |
| 8,040,103 B2 | 10/2011 | Hui et al. |
| 8,049,370 B2 | 11/2011 | Azancot et al. |
| 8,050,068 B2 | 11/2011 | Hussmann et al. |
| 8,169,185 B2 * | 5/2012 | Partovi et al. ................ 320/108 |
| 2002/0004167 A1 | 1/2002 | Jenson et al. |
| 2002/0067238 A1 | 6/2002 | Leu |
| 2002/0093309 A1 | 7/2002 | Peele |
| 2003/0094921 A1 | 5/2003 | Lau et al. |
| 2003/0103039 A1 | 6/2003 | Burr et al. |
| 2003/0210106 A1 | 11/2003 | Cheng |
| 2003/0214255 A1 | 11/2003 | Baarman |
| 2004/0113589 A1 | 6/2004 | Crisp |
| 2004/0130915 A1 | 7/2004 | Baarman |
| 2004/0130916 A1 | 7/2004 | Baarman |
| 2004/0145342 A1 | 7/2004 | Lyon |
| 2004/0150934 A1 | 8/2004 | Baarman |
| 2004/0222751 A1 | 11/2004 | Mollema |
| 2004/0232845 A1 | 11/2004 | Baarman |
| 2005/0007067 A1 * | 1/2005 | Baarman et al. .............. 320/108 |
| 2005/0017677 A1 | 1/2005 | Burton |
| 2005/0063488 A1 | 3/2005 | Troyk et al. |
| 2005/0075696 A1 | 4/2005 | Forsberg et al. |
| 2005/0093475 A1 | 5/2005 | Kuennen |
| 2005/0116650 A1 | 6/2005 | Baarman |
| 2005/0116683 A1 | 6/2005 | Cheng |
| 2005/0122058 A1 | 6/2005 | Baarman |
| 2005/0122059 A1 | 6/2005 | Baarman |
| 2005/0127849 A1 | 6/2005 | Baarman |
| 2005/0127850 A1 | 6/2005 | Baarman |

(56) References Cited

U.S. PATENT DOCUMENTS

| | | |
|---|---|---|
| 2005/0127867 A1 | 6/2005 | Calhoon et al. |
| 2005/0127869 A1 | 6/2005 | Calhoon et al. |
| 2005/0135122 A1 | 6/2005 | Cheng |
| 2005/0140482 A1 | 6/2005 | Cheng |
| 2005/0162125 A1 | 7/2005 | Yu |
| 2005/0189910 A1 | 9/2005 | Hui |
| 2006/0021926 A1 | 2/2006 | Woodard |
| 2006/0038794 A1 | 2/2006 | Schneidman |
| 2006/0105718 A1 | 5/2006 | Ozluturk |
| 2006/0106965 A1 | 5/2006 | Falcon |
| 2006/0108977 A1 | 5/2006 | Kagermeier |
| 2006/0132045 A1 | 6/2006 | Baarman |
| 2006/0146517 A1 | 7/2006 | Park |
| 2006/0202665 A1 | 9/2006 | Hsu |
| 2006/0205381 A1 | 9/2006 | Beart et al. |
| 2006/0238930 A1 | 10/2006 | Baarman |
| 2006/0284593 A1 | 12/2006 | Nagy |
| 2007/0029965 A1 | 2/2007 | Hui |
| 2007/0069687 A1 | 3/2007 | Suzuki |
| 2007/0109708 A1 | 5/2007 | Hussman et al. |
| 2007/0139000 A1 | 6/2007 | Kozuma et al. |
| 2007/0178945 A1* | 8/2007 | Cook et al. ............ 455/572 |
| 2007/0182367 A1 | 8/2007 | Partovi |
| 2007/0296393 A1 | 12/2007 | Malpas et al. |
| 2008/0014897 A1 | 1/2008 | Cook et al. |
| 2008/0067874 A1 | 3/2008 | Tseng |
| 2008/0164839 A1 | 7/2008 | Kato |
| 2008/0247210 A1 | 10/2008 | Hu |
| 2008/0258679 A1 | 10/2008 | Manico |
| 2008/0272889 A1* | 11/2008 | Symons ............ 340/10.1 |
| 2008/0278264 A1 | 11/2008 | Karalis et al. |
| 2009/0015075 A1 | 1/2009 | Cook |
| 2009/0033564 A1 | 2/2009 | Cook |
| 2009/0043727 A1 | 2/2009 | Cohen, Jr. et al. |
| 2009/0049554 A1 | 2/2009 | Vuong |
| 2009/0058189 A1 | 3/2009 | Cook et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0079268 A1 | 3/2009 | Cook et al. |
| 2009/0096413 A1 | 4/2009 | Partovi |
| 2009/0102292 A1 | 4/2009 | Cook et al. |
| 2009/0127937 A1 | 5/2009 | Widmer et al. |
| 2009/0134712 A1 | 5/2009 | Cook et al. |
| 2009/0167449 A1 | 7/2009 | Cook et al. |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1 | 10/2009 | Cook et al. |
| 2009/0257259 A1 | 10/2009 | Leibovitz |
| 2009/0267709 A1 | 10/2009 | Joannopoulos et al. |
| 2009/0267710 A1 | 10/2009 | Joannopoulos et al. |
| 2009/0284083 A1 | 11/2009 | Karalis et al. |
| 2009/0284227 A1 | 11/2009 | Mohammadian |
| 2010/0007307 A1* | 1/2010 | Baarman et al. ............ 320/108 |
| 2010/0038970 A1 | 2/2010 | Cook et al. |
| 2010/0066176 A1 | 3/2010 | Azancot |
| 2010/0070219 A1 | 3/2010 | Azancot |
| 2010/0072825 A1 | 3/2010 | Azancot |
| 2010/0073177 A1 | 3/2010 | Azancot |
| 2010/0081473 A1 | 4/2010 | Chatterjee |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0109443 A1 | 5/2010 | Cook et al. |
| 2010/0109445 A1 | 5/2010 | Kurs et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1* | 5/2010 | Cook et al. ............ 320/108 |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0164296 A1 | 7/2010 | Kurs et al. |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0181841 A1 | 7/2010 | Azancot |
| 2010/0181843 A1 | 7/2010 | Schatz et al. |
| 2010/0181845 A1 | 7/2010 | Fiorello et al. |
| 2010/0184371 A1 | 7/2010 | Cook et al. |
| 2010/0187911 A1 | 7/2010 | Joannopoulos et al. |
| 2010/0190435 A1 | 7/2010 | Cook et al. |
| 2010/0190436 A1 | 7/2010 | Cook et al. |
| 2010/0194336 A1 | 8/2010 | Azancot |
| 2010/0201313 A1 | 8/2010 | Vorenkamp |
| 2010/0207572 A1 | 8/2010 | Kirby et al. |
| 2010/0207771 A1 | 8/2010 | Trigiani |
| 2010/0213895 A1 | 8/2010 | Keating |
| 2010/0219183 A1 | 9/2010 | Azancot |
| 2010/0219693 A1 | 9/2010 | Azancot |
| 2010/0219697 A1 | 9/2010 | Azancot |
| 2010/0219698 A1 | 9/2010 | Azancot |
| 2010/0244584 A1 | 9/2010 | Azancot |
| 2010/0253281 A1 | 10/2010 | Li |
| 2010/0253282 A1 | 10/2010 | Azancot |
| 2010/0257382 A1 | 10/2010 | Azancot |
| 2010/0259401 A1 | 10/2010 | Azancot |
| 2010/0277120 A1 | 11/2010 | Cook et al. |
| 2010/0277121 A1* | 11/2010 | Hall et al. ............ 320/108 |
| 2010/0327804 A1 | 12/2010 | Takahashi |
| 2011/0012556 A1* | 1/2011 | Lai ............ 320/108 |
| 2011/0050164 A1 | 3/2011 | Partovi |
| 2011/0057606 A1 | 3/2011 | Saunamaki |
| 2011/0062793 A1 | 3/2011 | Azancot et al. |
| 2011/0090723 A1 | 4/2011 | Hu et al. |
| 2011/0095617 A1 | 4/2011 | Cook et al. |
| 2011/0121660 A1 | 5/2011 | Azancot et al. |
| 2011/0157137 A1 | 6/2011 | Ben-Shalom |
| 2011/0162035 A1 | 6/2011 | King |
| 2011/0187318 A1 | 8/2011 | Hui |
| 2011/0193520 A1 | 8/2011 | Yamazaki |
| 2011/0217927 A1 | 9/2011 | Ben-Shalom et al. |
| 2011/0221387 A1 | 9/2011 | Steigerwald |
| 2011/0221391 A1 | 9/2011 | Won |
| 2011/0222493 A1 | 9/2011 | Mangold |
| 2011/0266878 A9 | 11/2011 | Cook et al. |
| 2012/0126745 A1 | 5/2012 | Partovi |
| 2012/0146576 A1 | 6/2012 | Partovi |
| 2012/0235636 A1 | 9/2012 | Partovi |

FOREIGN PATENT DOCUMENTS

| | | |
|---|---|---|
| JP | 2009200174 | 9/2009 |
| JP | 408000838 | 11/2011 |
| KR | 10-0836634 | 6/2008 |
| WO | WO/03/096361 | 11/2003 |
| WO | WO03096512 A2 | 11/2003 |
| WO | WO/03/105311 | 12/2003 |
| WO | WO03105308 A1 | 12/2003 |
| WO | 2004030176 | 4/2004 |
| WO | WO2004030176 | 4/2004 |
| WO | WO2004038887 | 5/2004 |
| WO | WO2004038888 | 5/2004 |
| WO | WO2004055654 | 7/2004 |
| WO | WO2005024865 | 3/2005 |
| WO | WO2005109597 | 11/2005 |
| WO | WO2005109598 A1 | 11/2005 |
| WO | 2006001557 | 1/2006 |
| WO | 2006115368 | 11/2006 |

(56) References Cited

FOREIGN PATENT DOCUMENTS

| WO | 2008-137996 | 11/2008 |
|----|-------------|---------|
| WO | 2011156768 | 12/2011 |
| WO | 2012116054 | 8/2012 |

OTHER PUBLICATIONS

Abe, et al., "A Non-Contact Charger Using a Resonant Converter with Parallel Capacitor of the Secondary Coil", Apr. 2000, IEEE, vol. 36, No. 2, pp. 444-451.
Sakamoto, et al. "Large Air-Gap Coupler for Inductive Charger", Sep. 1999, IEEE, vol. 35, No. 5, pp. 3526-3528.
Sakamoto, et al. "A Novel Converter for Non-Contact Charging with Electromagnetic Coupling", Nov. 1993, IEEE, vol. 29, No. 6, pp. 3228-3230.
Kim, et al. "Design of a Contactless Battery Charger for Cellular Phone", Dec. 2001, IEEE, vol. 48, No. 6, pp. 1238-1247.
Hui, et al. "Coreless Printed-Circuit Board Transformers for Signal and Energy Transfer", Electronics Letters, May 1998, vol. 34, No. 11, pp. 1052-1054.
Hui, et al. "Optimal Operation of Coreless PCB Transformer-Isolated Gate Drive Circuits with Wide Switching Frequency Range", May 1999, IEEE Transactions of Power Electronics, vol. 14, No. 3, pp. 506-514.
Tang, et al. "Characterization of Coreless Printed Circuit Board (PCB) Transformers", Nov. 2000, IEEE Transactions of Power Electronics, vol. 15, No. 6, pp. 1275-1282.
Tang, et al. "Coreless Printed Circuit Board (PCB) Transformers with Multiple Secondary Windings for Complementary Gate Drive Circuits", May 1999, IEEE Transactions of Power Electronics, vol. 14, No. 3, pp. 431-437.
Tang, et al. "Coreless Printed Circuit Board (PCB) Transformers with High Power Density and High Efficiency", May 2000, Electronics Letters, vol. 36, No. 11, pp. 943-944.
Borenstein, "Man Tries Wirelessly Boosting Batteries", Nov. 2006, USA Today, http://www.usatoday.com/tech/wireless/data/2006-11-16-wireless-recharging_x.htm, 5 pages.
Murph, "WildCharger Charges Your Gadgetry Sans Wires", Dec. 2006, Misc. Gadgets, 2 pages.
Gizmo Watch, "Pitstop: A Table Top Recharging Solution by Belkin", http://www.gizmowatch.com/entry/pitstop-a-table-top-re-charging-solution-by-belkin, Dec. 2006, 5 pages.
Unknown Author, "Cutting the Cord", Apr. 2007, The Economist, 1 page.
Bishop, "Microsoft Surface Brings Computing to the Table", May 2007, http://seattlepi.nwsource.com/business/317737_msftdevic30.html, 7 pages.
Wildcharge, "The Wire-Free Power Revolution is Only Days Away, and WildCharge, Inc. Is Leading the Charge", Sep. 2007, 3 pages.
PCT International Search Report dated Feb. 14, 2008 in re International Application No. PCT/US07/61406, 8 pages.
PCT International Search Report dated Aug. 8, 2008 re: PCT Application No. PCT/US08/63084, 8 pages.
WildCharge Life Unplugged!, http://www.wildcharge.com/, Apr. 17, 2009, 2 pages.
Powermat "The Future of Wireless Power Has Arrived", http://www.pwrmat.com, Apr. 15, 2009, 2 pages.
eCoupled Wireless Power Technology Fulton Innovation, http://www.ecoupled.com, Apr. 15, 2009, 5 pages.
eCoupled Wireless Power Technology Patents Fulton Innovation, http://www.ecoupled.com, Apr. 15, 2009, 4 pages.
Qualcomm Products and Services—Wireless Airlink Technologies, http://www.qualcomm.com/products_services/airlinks, Apr. 15, 2009, 3 pages.
Economist.com Science Technology Quarterly, "Wireless Charging", http://www.economist.com/science/tq/PrinterFriendly.cfm?story_id=13174387, Apr. 15, 2009, 4 pages.
Office Action in connection with U.S. Appl. No. 11/669,113 dated Oct. 29, 2008, 29 pages.

Final Office Action in connection wtih U.S. Appl. No. 11/669,113 dated Aug. 25, 2009, 25 pages.
Office Action in connection with U.S. Appl. No. 11/669,113 dated May 13, 2010, 22 pages.
International Search Report and Written Opinion of the International Searching Authority, Korean Intellectual Property Office, in re International Application No. PCT/US2010/032845 dated Dec. 13, 2010, 10 pages.
Office Action in connection with U.S. Appl. No. 11/757,067 dated Jan. 26, 2009, 26 pages.
Office Action in connection with U.S. Appl. No. 11/757,067 dated Oct. 19, 2009, 23 pages.
Office Action in connection with U.S. Appl. No. 11/757,067 dated May 10, 2010, 21 pages.
Office Action in connection with U.S. Appl. No. 12/116,876 dated May 2, 2011, 8 pages.
Hui, "A New Generation of Universal Contactless Battery Charging Platform for Portable Consumer Electronic Equipment", IEEE Transactions on Power Electronics, vol. 20, No. 3, May 2005, pp. 620-627, 8 pages.
Tang, et al., "Evaluation of the Shielding Effects on Printed-Circuit-Board Transformers Using Ferrite Plates and Copper Sheets", IEEE Transactions on Power Electronics, vol. 17, No. 6, Nov. 2002, pp. 1080-1088, 9 pages.
Liu, et al., "An Analysis of a Double-Layer Electromagnetic Shield for a Universal Contactless Battery Charging Platform", Department of Electronic Engineering City University of Hong Kong, IEEE, 2005, pp. 1767-1772, 6 pages.
Liu, et al., Equivalent Circuit Modeling of a Multilayer Planar Winding Array Structure for Use in a Universal Contactless Battery Charging Platform, IEEE Transactions on Power Electronics, vol. 22, No. 1, Jan. 2007, pp. 21-29, 9 pages.
Liu, et al., "Simulation Study and Experimental Verification of a Universal Contactless Battery Charging Platform with Localized Charging Features", IEEE Transactions on Power Electronics, vol. 22, No. 6, Nov. 2007, pp. 2202-2210, 9 pages.
Liu, et al., "Optimal Design of a Hybrid Winding Structure for Planar Contactless Battery Charging Platform", IEEE Transactions on Power Electronics, vol. 23, No. 1, Jan. 2008, pp. 455-463, 9 pages.
Karalis, et al., "Efficient Wirelss Non-Radiative Mid-Range Energy Transfer", ScienceDirect, Annals of Physics 323, 2008, pp. 34-48, 15 pages.
Su, et al., "Mutual Inductance Calculation of Movable Planar Coils on Parallel Surfaces", IEEE Transactions on Power Electronics, vol. 24, No. 4, Apr. 2009, pp. 1115-1124, 10 pages.
Hui, et al., "Coreless Printed Circuit Board (PCB) Transformers—Fundamental Characteristics and Application Potential", IEEE Circuits and Systems, Vo. 11, No. 3, Third Quarter 2000, pp. 1-48, 48 pages.
Sekitani, et al., "A Large-Area Flexible Wireless Power Transmission Sheet Using Printed Plastic MEMS Switches and Organic Field-Effect Transistors", IEEE, Quantum-Phase Electronics Center, School of Engineering, The University of Tokyo, 2006, 4 pages.
Choi, et al., "A New Contactless Battery Charger for Portable Telecommunication/Compuing Electronics", IEEE, School of Electronic and Electrical Engineering, Kyungpook National University, Taegu, Korea, 2011, pp. 58-59 2 pages.
Hui, et al., "Coreless Printed Circuit Board (PCB) Transformers for Power MOSFET/IGBT Gate Drive Circuits", IEEE Transactions on Power Electronics, vol. 14, No. 3, May 1999, pp. 422-430, 9 pages.
Tang, et al., "Coreless Planar Printed-Circuit-Board (PCB) Transformers—A Fundamental Concept for Signal and Energy Transfer", IEEE Transactions on Power Electronics, Vol.15, No. 5, Sep. 2000, pp. 931-941, 11 pages.
Hatanaka, et al., "Power Transmission of a Desk with Cord-Free Power Supply", IEEE Transactions on Magnetics, vol. 38, No. 5, Sep. 2002, pp. 3329-3331, 3 pages.
Fernandez, et al., "Design Issues of a Core-less Transformer for a Contact-less Application", IEEE, Universidad Politecnica de Madrid, 2002, pp. 339-345, 7 pages.

(56) References Cited

OTHER PUBLICATIONS

Hui, et al., "A New Generation of Universal Contactless Battery Charging Platform for Portable Consumer Electronic Equipment", IEEE Transactions on Power Electronics, vol. 20, No. 3, May 2005, pp. 620-627, 8 pages.

Liu, et al., "Optimal Design of a Hybrid Winding Structure for Planar Contactless Battery Charging Platform", IEEE, Department of Electronic Engineering, City University of Hong Kong, 2006, pp. 2568-2575, 8 pages.

Topfer, et al., "Multi-Pole Magnetization of NdFeB Sintered Magnets and Thick Films for Magnetic Micro-Actuators", ScienceDirect, Sensor and Actuators, 2004, pp. 257-263, 7 pages.

Topfer, et al., "Multi-Pole Magnetization of NdFeB Magnets for Magnetic Micro-Actuators and Its Characterization with a Magnetic Field Mapping Device", ScienceDirect, Journal of Magnetism and Magnetic Materials, 2004, 124-129, 6 pages.

Sakamoto, et al., "A Novel High Power Converter for Non-Contact Charging with Magnetic Coupling", IEEE Transactions on Magnetics, vol. 30, No. 6, Nov. 1994, pp. 4755-4757, 3 pages.

Hui, et al., "Some Electromagnetic Aspects of Coreless PCB Transformers", IEEE Transactions on Power Electronics, vol. 15, No. 4, Jul. 2000, pp. 805-810, 6 pages.

Waffenschmidt, et al., "Limitation of Inductive Power Transfer for Consumer Applications", 13th European Conference on Power Electronics and Applications, Barcelona, 2009. EPE '09. pp. 1-10, 10 pages.

Stokes, "Palm Strikes Back with new OS, Pre Handset at CES, http://arstechnica.com/news.ars/post/20090101-palm-laundhes-new-handset-pre-operating", Jan. 8, 2009, 6 pages.

Sullivan, Visteon to Sell Wireless Gadget Charger, "Wire-Free Technology will Lets Consumers Dump Cords and Chargers", Red Herring, Dec. 29, 2006, 2 pages.

Kim, "Wireless Charger for New Palm Phone", San Francisco Chronicle and SFGate.com, May 11, 2009, 2 pages.

Compeau, Red Zen Marketing, "Could This be the Mojo Behind the Palm Pre's Touchstone Charger?", http://redzenmarketing.posterous.com/could-this-be-the-mojo-behind-the-palm-pres-t, Jun. 5, 2009, 3 pages.

Fulton Innovation LLC, "The Big Story for CES 2007: The Public Debut of eCoupled Intelligent Wireless Power", ecoupled, Dec. 27, 2006, 2 pages.

Miller, "Palm May Make Pre Scarce", The San Jose Mercury News, Apr. 29, 2009, 1 page.

Murakami et al., "Consideration on Cordless Power Station Contactless Power Transmission System", IEEE Transactions on Magnets, vol. 32, No. 5, Sep. 1996, 3 pages.

PCT International Preliminary Report on Patentability dated Nov. 10, 2011 in re International Application No. PCT/US2010/032845, 7 pages.

WiPower, Wikipedia, the free encyclopedia, http://en.wikipedia.org/wiki/WiPower, Nov. 18, 2011, 2 pages.

PowerbyProxi, Wireless Power Solutions, http://www.powerbyproxi.com/, Nov. 18, 2011, 2 pages.

Now charge your iPhone 4 and 4S with Powermat!, Wireless charging mats and receivers for your iPhone, iPod, Blackberry . . . http://www.powermat.com/, Nov. 18, 2011, 1 page.

Witricity, Wireless Electricity Delivered Over Distance, http://www.witricity.com, Nov. 18, 2011, 1 page.

ConvenientPower, ConvenientPower HK Limited, http://www.convenientpower.com/1/about.php, Nov. 18, 2011, 1 page.

Nigel Power LLC: Private Company Information—Business Week, http://investing.businessweek.com/research/stocks/private/snapshot.asp?p . . . , Nov. 18, 2011, 2 pages.

HaloIPT—Wireless Charging is the future for powering electric cars and it . . . , http://www.haloipt.com/, Nov. 18, 2011, 1 page.

Qualcomm Buys HaloIPT for Wireless Charging Technology, Wireless Power Planet, http://www.wirelesspowerplanet.com/news/qualcomm-buys-haloipt-for- . . . , Nov. 18, 2011, 5 pages.

United States Patent and Trademark Office, Office Action for U.S. Appl. No. 13/708,548, Nov. 20, 2013, 5 pages.

United States Patent and Trademark Office, Office Action for U.S. Appl. No. 13/115,811, Sep. 23, 2013, 17 pages.

United States Patent and Trademark Office, Office Action for U.S. Appl. No. 13/708,584, Sep. 13, 2013, 16 pages.

Unknown Author, System Description Wireless Power Transfer, vol. I: Low Power Part 1: Interface Definition, Version 1.0, Jul. 2010, 83 pages.

The Patent Office of the People's Republic of China, 2nd Office Action for Chinese Patent Application No. 200880023854.4, Apr. 15, 2013, 4 pages.

International Searching Authority, International Search Report and Written Opinion for PCT/US2012/021729, Aug. 31, 2012, 9 pages.

International Searching Authority, International Search Report and Written Opinion for PCT/US2013/033352, Jun. 14, 2013, 21 pages.

European Search Report and Search Opinion in connection with European Patent Application No. 08747863.2 (European National Stage application of PCT/US2008/063084) dated Apr. 2, 2013, 7 pages.

International Searching Authority at the U. S. Patent and Trademark Office, International Search Report and Written Opinion for PCT International Patent Application No. PCT/US2013/078534, May 13, 2014, 11 pages.

International Searching Authority and Written Opinion From the U. S. Patent and Trademark Office, International Search Report and Written Opinion for PCT International Application No. PCT/US2013/069270, Apr. 4, 2014, 9 pages.

European Patent Office, Office Action for European Patent Publication Application No. EP2151037, Apr. 9, 2014, 5 pages.

\* cited by examiner

OPTIONAL MAGNETIC SHIELD MATERIAL OR SHEET

OPTIONAL CUT OR DISCONTINUITY IN SHEET

SYSTEM FOR WIRELESS POWER TRANSFER THAT SUPPORTS INTEROPERABILITY, AND MULTI-POLE MAGNETS FOR USE THEREWITH

CLAIM OF PRIORITY

This application claims the benefit of priority to U.S. Provisional Patent Applications "IMPROVED MAGNETS FOR USE IN PROXIMITY TO MAGNETICALLY SENSITIVE PARTS OR DEVICES", Application No. 61/354,114, filed Jun. 11, 2010; "SYSTEM AND METHOD FOR PROVIDING A UNIVERSAL-COMPATIBLE WIRELESS POWER SYSTEM", Application No. 61/387,895, filed Sep. 29, 2010; and "SYSTEM AND METHOD FOR PROVIDING A UNIVERSAL-COMPATIBLE WIRELESS POWER SYSTEM", Application No. 61/478,015, filed Apr. 21, 2011, each of which applications are hereby incorporated by reference herein.

CROSS-REFERENCE TO RELATED APPLICATIONS

This application is related to U.S. patent applications "INDUCTIVE POWER SOURCE AND CHARGING SYSTEM", application Ser. No. 11/669,113, filed Jan. 30, 2007 (subsequently published as U.S. Publication No. 20070182367, and issued as U.S. Pat. No. 7,952,322); "POWER SOURCE, CHARGING SYSTEM, AND INDUCTIVE RECEIVER FOR MOBILE DEVICES", application Ser. No. 11/757,067, filed Jun. 1, 2007 (subsequently published as U.S. Publication No. 20070279002, and issued as U.S. Pat. No. 7,948,208); "SYSTEM AND METHOD FOR INDUCTIVE CHARGING OF PORTABLE DEVICES", application Ser. No. 12/116,876, filed May 7, 2008 (subsequently published as U.S. Publication No. 20090096413); and "SYSTEM AND METHODS FOR INDUCTIVE CHARGING, AND IMPROVEMENTS AND USES THEREOF"; application Ser. No. 12/769,586, filed Apr. 28, 2010 (subsequently published as U.S. Publication No. 20110050164), each of which applications are hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to inductive charging, including applications for use in mobile or other devices and vehicles, and improved compatibility and transfer of wireless power; and is also related to the use of magnets in electronic devices, and in particular to devices or parts having proximity to magnetic sensors.

BACKGROUND

Wireless technologies for powering and charging mobile and other electronic devices and vehicles have been developed. These systems generally use a wireless charger or transmitter system and a wireless receiver in combination to provide a means for transfer of power across a distance. For safe and efficient operation the two parts of the system often communicate with each other to verify the presence of receivers and/or initiate charging and continued power transfer. To enable interoperability between chargers and receivers, it is important that the two parts of the system (the charger and the receiver) can communicate in a manner that allows such operation.

Additionally, many mobile, industrial, automotive, medical devices, etc. contain compasses or other components that are sensitive to magnetic field. At the same time, it is often desired to use magnets for fastening or attachment, or alignment purposes near such devices without affecting the operation of such sensitive material. One application may be fastening of a mobile device or phone to a surface in a car or other vehicle to avoid movement during transport.

These are the general areas that embodiments of the invention are intended to address.

SUMMARY

As described above, to enable interoperability between chargers and receivers, it is important that the two parts of the system (the charger and receiver) can communicate in a manner that allows operation. With the proliferation of different communication schemes, a multi-protocol system that can adapt and interoperate with different communication protocols allows maximum interoperability. Described herein are systems and methods for providing such multi-protocol operation and maximum interoperability. Also described herein are methods for use of magnets in or around magnetically sensitive devices such that the operation of such a device is not impaired. Applications in various devices and systems are described. In particular, applications for fastening mobile devices to their cases or other surfaces, and also alignment or attachment for power transfer or charging are described. Also described herein are systems and methods for the use of multi-pole and other magnets, in electronic and other articles, devices, components, or parts thereof.

DETAILED DESCRIPTION

With the proliferation of electrical and electronic devices and vehicles (which are considered devices herein), simple and universal methods of providing power and or charging of these devices is becoming increasingly important. To enable a user to easily charge or power these devices, a simple non-contact method such as wireless power transfer is increasingly important.

Many of these devices contain internal batteries, and the device may or may not be operating during receipt of power. Depending on the degree of charge status of the battery or its presence and the system design, the applied power may provide power to the device, charge its battery or a combination of the above. The terms charging and/or power are used interchangeably herein to indicate that the received power can be used for either of these cases or a combination thereof. Unless specifically described, these terms are therefore used interchangeably.

Figure 1:
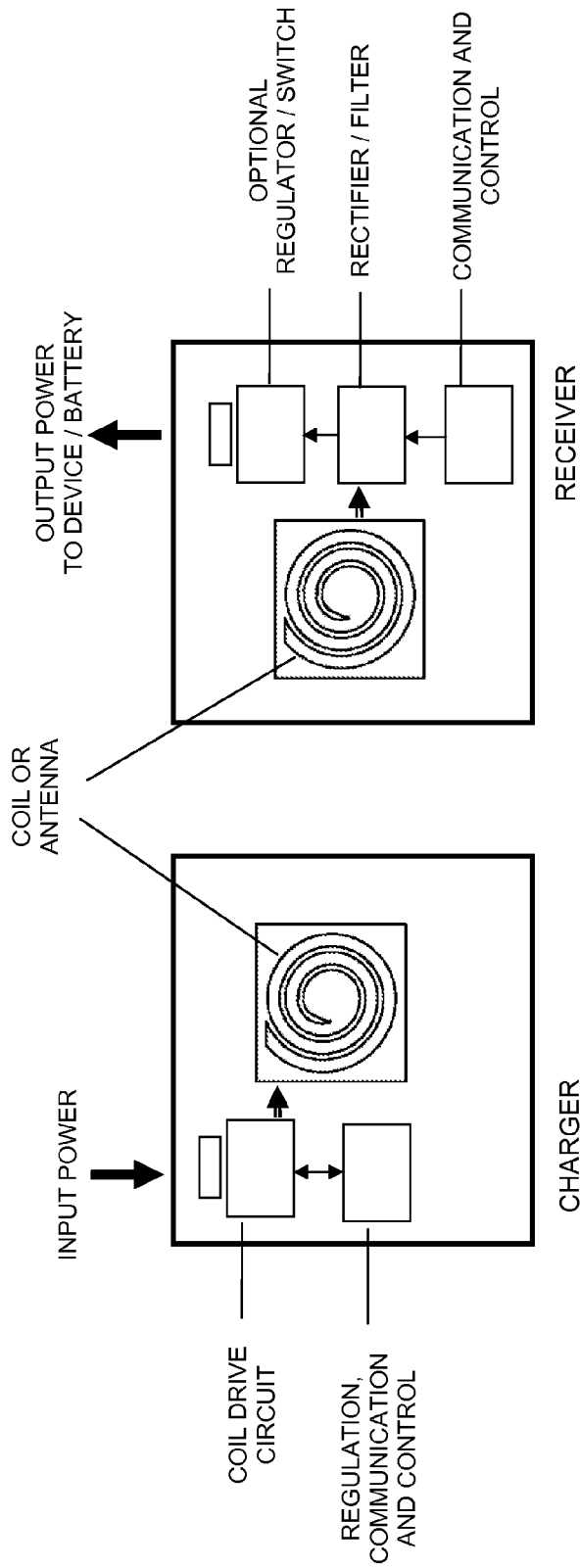
FIG. 1 illustrates an example of a wireless charger or power system that comprises a charger or transmitter part, and a receiver part, in accordance with an embodiment.

As shown in FIG. 1, a wireless charger or power system comprises a charger or transmitter part, and a receiver part. The charger or transmitter can generate a repetitive power signal pattern (such as a sinusoid or square wave from 10's of Hz to several MHz or even higher but typically in the 100 kHz to several MHz range) with its coil drive circuit and a coil or antenna for transmission of the power. The charger or transmitter typically also includes a communication and regulation/control system that detects a receiver and/or turns the applied power on or off and/or modify the amount of applied power by mechanisms such as changing the amplitude, frequency or duty cycle, etc. or a combination thereof of the applied power signal to the coil or antenna.

The second part of the system is a receiver that includes a coil or antenna to receive power, a method for change of the received AC voltage to DC voltage such as rectification and smoothing with one or more rectifiers or a bridge or synchronous rectifier, etc. and one or more capacitors and optionally, a method for the receiver to communicate with the charger.

In accordance with an embodiment, the method of communication between the charger and receiver can be through the same coils as for transfer of power, through a separate coil, through an RF or optical link or combination thereof. In case of communication through the power transfer coil, one method for the communication is to modulate the load in the receiver to affect the voltage in the receiver coil and therefore create a modulation in the charger coil parameters that can be detected through monitoring of its voltage or current. Other methods can include frequency modulation by combining the received frequency with a local oscillator signal or inductive, capacitive, or resistive modulation of the output of the receiver coil.

In accordance with an embodiment, the communicated information can be the output voltage, current, device or battery status, validation ID for receiver, end of charge or various charge status information, receiver battery, device, or coil temperature, or user data.

In accordance with an embodiment, the data communicated can be any of the information detailed herein, or the difference between these values and the desired value or simple commands to increase or decrease power or simply one or more signals that would confirm presence of a receiver or a combination of the above. In addition, the receiver can include other elements such as a dc to dc converter or regulator such as a switching, buck, boost, buck/boost, or linear regulator. The receiver may also include a switch between the DC output of the receiver coil and its output to a device or battery or a device case or skin and in cases where the receiver is used to charge a battery, the receiver may also include a battery charger IC or circuitry and/or battery protection circuit and associated transistors, etc. The receiver and/or charger and/or their coils can also include elements such as thermistors, magnetic shields or magnetic cores, magnetic sensors, and input voltage filters, etc. for safety and/or emission compliance reasons. In addition, the charger and or receiver can include means to provide more precise alignment between the charger and receiver coils or antennas. These may include visual, physical, or magnetic means to assist the user in alignment of parts. To implement more positioning freedom of the receiver on the charger, the size of the coils can also be mismatched. For example, the charger can comprise a larger coil size and the receiver a smaller one or vice versa, so that the coils do not have to be precisely aligned for power transfer.

In accordance with an embodiment, the power section (coil drive circuit and receiver power section) can be a resonant, zero switching, flyback, or any other appropriate topology.

Figure 2:
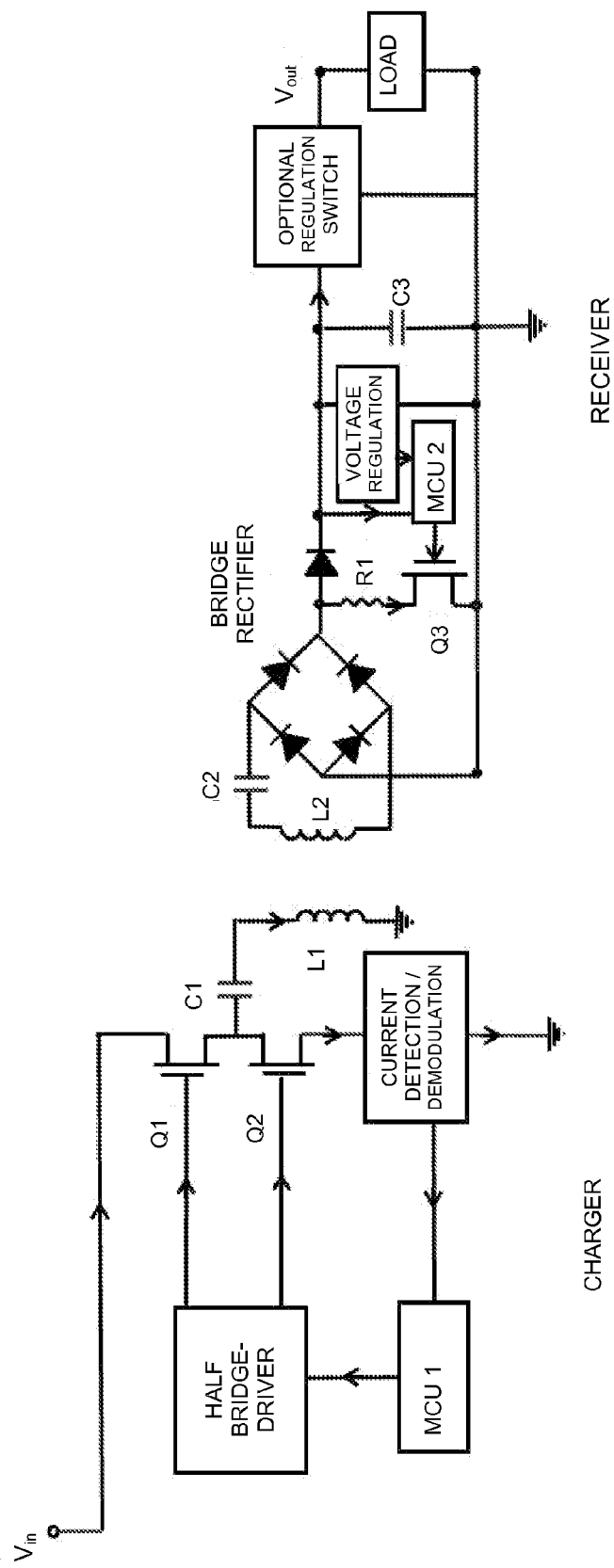
FIG. 2 shows a more detailed view of the wireless charger system with a resonant converter geometry, in accordance with an embodiment.

FIG. 2 shows a more detailed view of the wireless charger system with a resonant converter geometry where a pair of transistors Q1 and Q2 (such as FETs) are driven by a half-bridge driver IC and the voltage is applied to the coil L1 through one or more capacitors shown as C1. The receiver includes a coil and an optional capacitor (for added efficiency) shown as C2 that may be in series or in parallel with the receiver coil L2. The charger and/or receiver coils may also include magnetic material layers behind them to increase their inductance or to shield the magnetic field leakage to surrounding area.

In accordance with an embodiment, the charger also includes a circuit that measures the current through and/or voltage across the charger coil (in this case a current sensor is shown in the figure as an example). Various demodulation methods for detection of the communication signal on the charger current or voltage are available. This demodulation mechanism can be an AM or FM receiver (depending on whether amplitude or frequency modulation is employed in the receiver modulator) similar to a radio receiver tuned to the frequency of the communication or a heterodyne detector, etc.

In accordance with an embodiment, the microcontroller unit (MCU) in the charger (MCU1) is responsible for understanding the communication signal from the detection/demodulation circuit and, depending on the algorithm used, making appropriate adjustments to the charger coil drive circuitry to achieve the desired output voltage, current or power from the receiver output. In addition, MCU1 is responsible for processes such as periodic start of the charger to seek a receiver at the start of charge, keeping the charger on when a receiver is found and accepted as a valid receiver, continuing to apply power and making necessary adjustments, and/or monitoring temperature or other environmental factors, providing audio or visual indications to the user on the status of charging or power process, etc. or terminating charging or application of power due to end of charge or customer preference or over temperature, over current, over voltage, or some other fault condition or to launch or start another program or process. For example, the charger can be built into a car and once a valid receiver integrated into or on a mobile device, its case or skin, or battery is found, the charger may activate some other functions such as Bluetooth connectivity to the device, displaying the device identity on a display, etc. Other similar actions can be done in other environments. It may be useful in addition to the communication signal to detect the dc value of the current through the charger coil. For example, faults may be caused by insertion or presence of foreign objects such as metallic materials between the charger and receiver. These materials may be heated by the application of the power and can be detected through detection of the charger current or temperature or comparison of input voltage, current, or power to the charger and output voltage, current, or power from the receiver and concluding that the ratio is out of normal range and extra power loss due to unknown reasons is occurring. In these conditions or other situations such as abnormal charger and/or receiver heating, the charger may be programmed to declare a fault condition and shut down and/or alert the user or take other actions.

Once the charger MCU has received a signal and decoded this signal, it can take action to provide more or less power to the charger coil. This can be accomplished through known methods of adjusting the frequency, duty cycle or input voltage to the charger coil or a combination of these approaches. Depending on the system and the circuit used, the MCU can directly adjust the bridge driver or an additional circuit such as a frequency oscillator may be necessary to drive the bridge driver or the FETs.

A typical circuit for the receiver in accordance with an embodiment, is also shown in FIG. 2. In accordance with an embodiment, the receiver circuit can include a capacitor C2 in parallel or series with the receiver coil to produce a tuned receiver circuit. This circuit is known to increase the efficiency of a wireless power system. The rectified and smoothed (through a bridge rectifier and capacitors) output of the receiver coil and optional capacitor is either directly or through a switch or regulator applied to the output. A microcontroller is used to measure various values such as output voltage, current, temperature, state of charge, battery full status, end of charge, etc. and to report back to the charger to provide a closed loop system with the charger as described above. In the circuit shown in FIG. 2, the receiver MCU communicates back to the charger by modulating the receiver load by rapidly closing and opening a switch in series with a modulation load at a pre-determined speed and coding pattern. This rapid load modulation technique at a frequency distinct from the power transfer frequency can be easily detected by the charger. A capacitor and/or inductor can also be placed in parallel or in series with this load.

For example, one may assume that the maximum current output of the receiver is 1000 mA and the output voltage is 5 V for a maximum output of 5 W. In this case, the minimum load resistance is 5 ohms. A modulation load resistor of several ohms (20, or 10 ohms or smaller) would be able to provide a large modulation depth signal on the receiver coil voltage. Choosing a 5 ohm resistor would modulate the output between a maximum current of 1 Amp or larger and a smaller value defined by the device load at the output. Such a large modulation can be easily detected at the charger coil current or voltage as described above.

The receiver in FIG. 2 also shows an optional dc regulator that is used to provide constant stable voltage to the receiver MCU. This voltage supply may be necessary to avoid drop out of the receiver MCU during startup conditions where the power is varying largely or during changes in output current and also to enable the MCU to have a stable voltage reference source so it can measure the output voltage accurately.

In the above description, a uni-directional communication (from the receiver to the charger) is described. However, this communication can also be bi-directional and data can be transferred from the charger to the receiver through modulation of the voltage or current in the charger coil and read back by the microcontroller in the receiver detecting a change in the voltage or current, etc.

In accordance with an embodiment, in other geometries where position independence on placement of the receiver on the charger surface is achieved by having multiple charger coils in an array or pattern, similar drive and communication circuits in the charger and receiver can be implemented. However, to detect the appropriate coil to activate in the charger, the coils can be activated in a raster or zigzag fashion or other geometry and current drawn from a charger coil, strength of voltage, current, power or signal from the receiver or other methods can be used to determine the closest match between position of one or more of the charger coils and a receiver coil and the appropriate charger coil or coils can be activated and modulated to provide optimum power transfer to the receiver.

Figure 3:
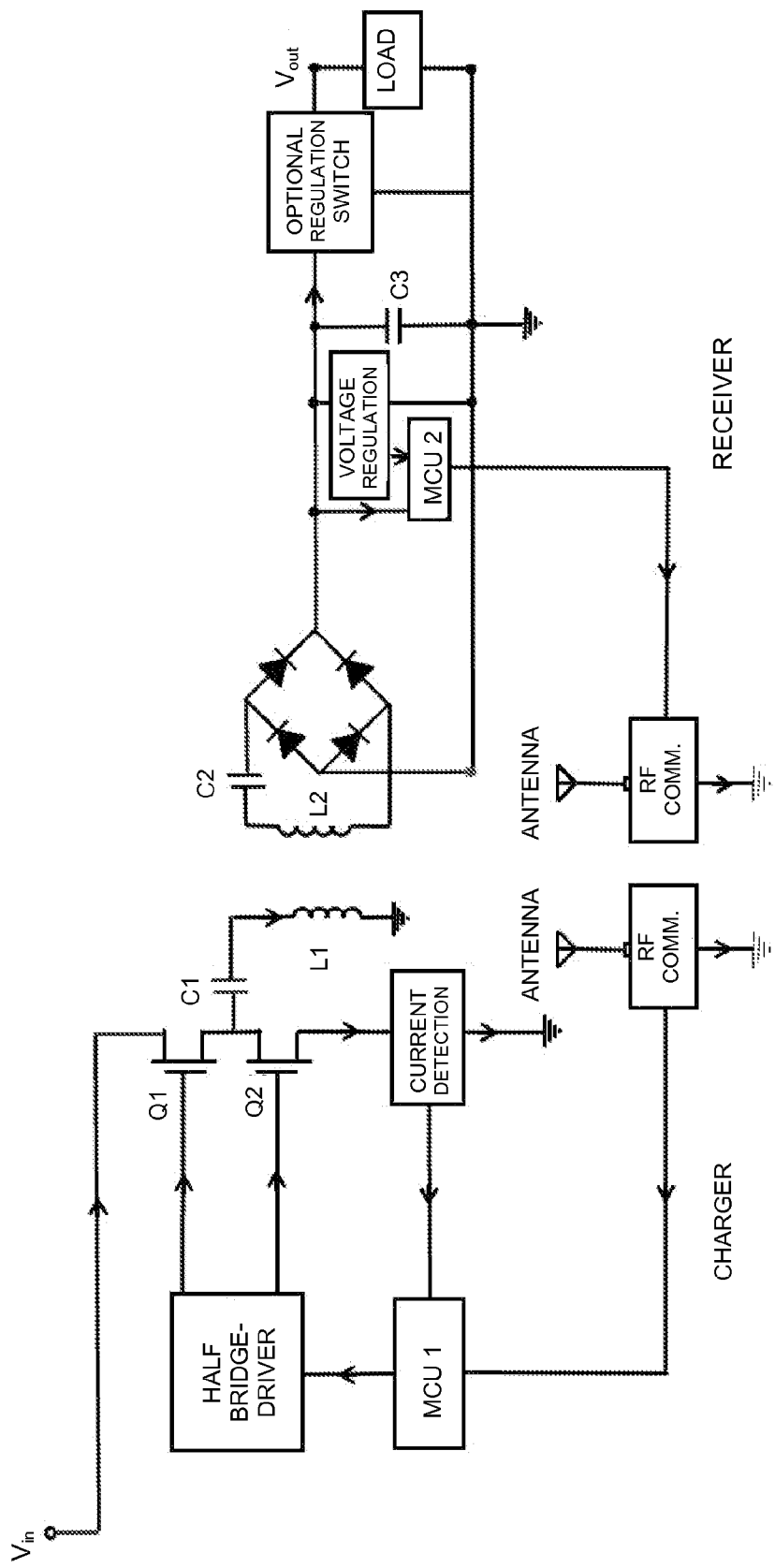
FIG. 3 illustrates a system wherein a dedicated RF channel for uni-directional or bi-directional communication between the charger and receiver is implemented for validation and/or regulation purposes, in accordance with an embodiment.

While a system for communication between the charger and receiver through the power transfer coil or antenna is described above, the communication can also be implemented through a separate coil, a radio frequency link (am or fm or other communication method), an optical communication system or a combination of the above. The communication in any of these methods can also be bi-directional rather than uni-directional as described above. As an example, FIG. 3 shows a system in accordance with an embodiment, wherein a dedicated RF channel for uni-directional or bi-directional communication between the charger and receiver is implemented for validation and/or regulation purposes. This system is similar to the system shown in FIG. 2, except rather than load modulation being the method of communication, the MCU in the receiver transmits the necessary information over an RF communication path. A similar system with LED or laser transceivers or detectors and light sources can be implemented. Advantages of such system may be that the power received is not modulated and therefore not wasted during communication and/or that no noise due to the modulation is added to the system.

Figure 4:
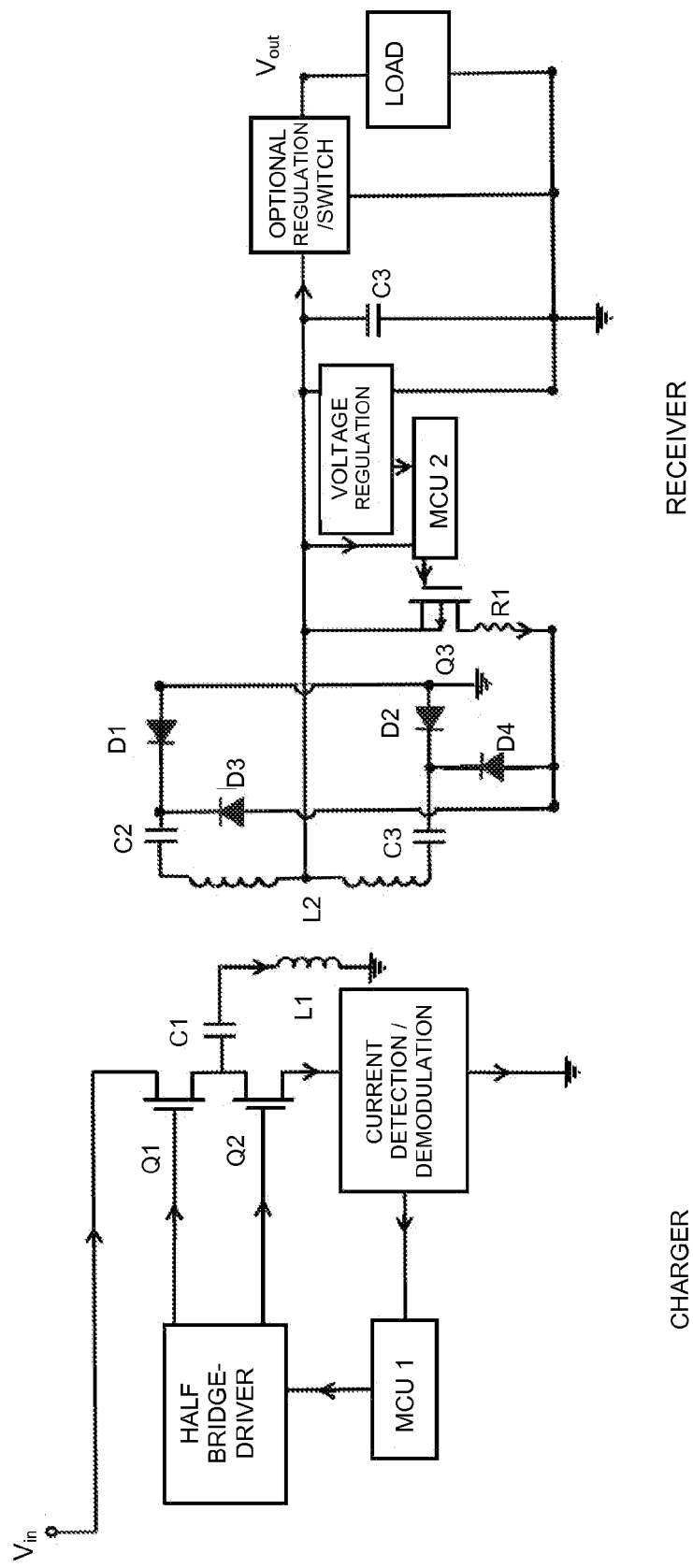
FIG. 4 illustrates the use a center-tapped receiver wherein during each cycle current passes only through one part of the coil and one diode in the receiver and therefore halves the rectification losses, in accordance with an embodiment.

One of the disadvantages of the circuit shown in FIG. 2 is that in the receiver circuit shown therein, the current path passes through 2 diodes and suffers 2 voltage drops resulting in large power dissipation and loss. For example, for Schottky diodes with forward voltage drop of 0.4 V, at a current output of 1 A, each diode would lose 0.4 W of power for a combined power loss of 0.8 W for the two in a bridge rectifier configuration. For a 5 V, 1 A output power (5 W), this 0.8 W of power loss presents a significant amount of loss (16%) just due to the rectification system. In accordance with an embodiment, an alternative is to use a center-tapped receiver as shown in FIG. 4 wherein during each cycle current passes only through one part of the coil and one diode in the receiver and therefore halves the rectification losses. Such a center tapped coil can be implemented in a wound wire geometry with 2 sections of a wound wire or a printed circuit board coil or with a double or multi-sided sided PCB coil or a combination or even a stamped, etched or otherwise manufactured coil or winding.

Figure 5:
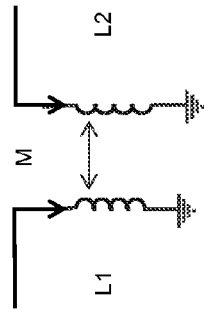
FIG. 5 illustrates that the charger and receiver coils can be represented by their respective inductances by themselves and the mutual inductance between, in accordance with an embodiment.

In any of the systems described above, as shown in FIG. 5, the charger and receiver coils can be represented by their respective inductances by themselves (L1 and L2) and the mutual inductance between them M which is dependent on the material between the 2 coils and their position with respect to each other in x, y, and z dimensions. The coupling coefficient between the coils k is given by:

$$k = M/(L1*L2)^{1/2}$$

The coupling coefficient is a measure of how closely the 2 coils are coupled and may range from 0 (no coupling) to 1 (very tight coupling). In coils with small overlap, large gap between coils or dissimilar coils (in size, number of turns, coil winding or pattern overlap, etc.), this value can be smaller than 1.

Figure 7:
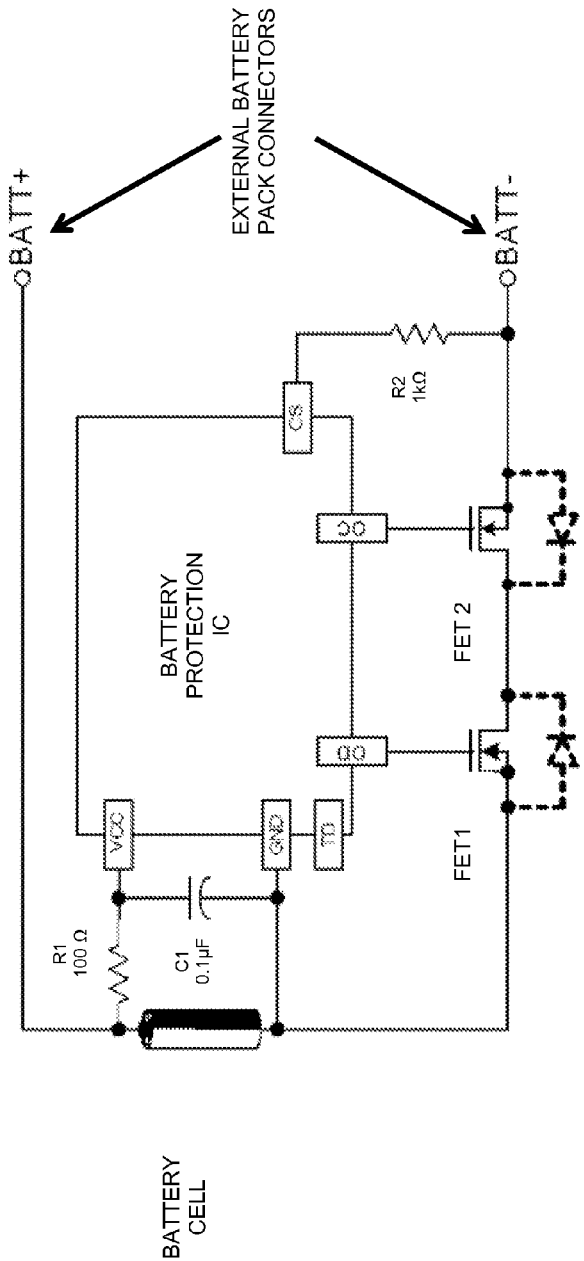
FIG. 7 illustrates the use of a battery cell connected through a protection circuit comprising a battery protection IC that protects a battery from over-current and under or over voltage, in accordance with an embodiment.
Figure 6:
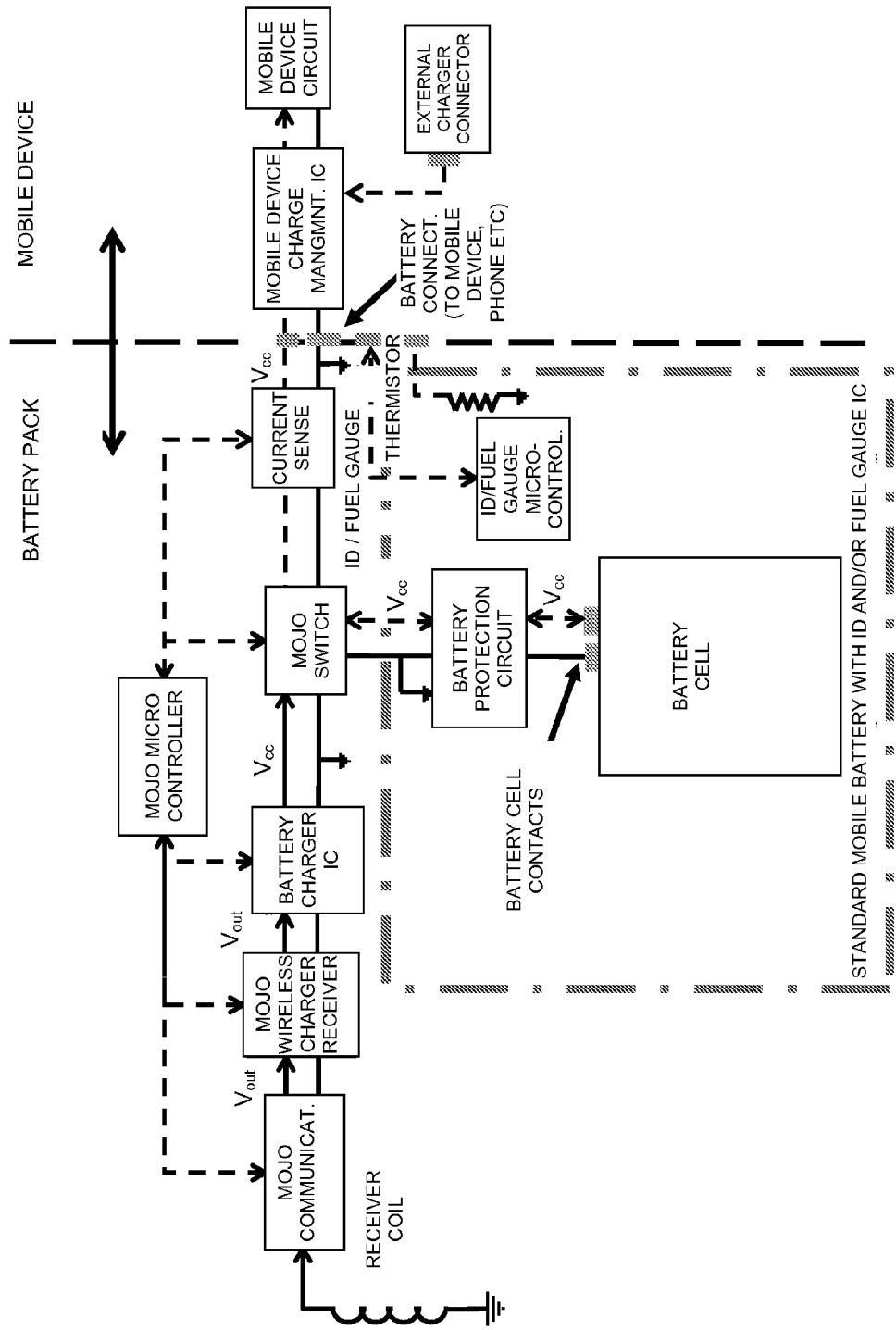
FIG. 6 shows a wirelessly powered battery pack and receiver, in accordance with an embodiment.

FIG. 6 shows a wirelessly powered battery pack and receiver in accordance with an embodiment. The components of a typical common battery pack (battery cell and protection circuit, etc.) used in a battery device used in applications such as mobile phone, etc. are shown inside the dashed lines. The components outside the dashed lines are additional components necessary to enable safe wireless and wired charging of a battery pack. A battery pack may have four or more external connector points that interface with a mobile device pins in a battery housing or with an external typical wired charger. In accordance with an embodiment, the battery cell is connected as shown in FIG. 7 to two of these connectors (shown in the figure as Batt+ and Batt−) through a protection circuit comprising a battery protection IC that protects a battery from over-current and under or over voltage. A typical IC may be Seiko 8241 IC that uses 2 external FETs as shown in FIG. 7 to prevent current going from or to the battery cell (on the left) from the external battery pack connectors if a fault condition based on over current, or battery cell over or under voltage is detected. This provides safety during charging or discharging of the battery. In addition, a battery pack may include a PTC conductive polymer passive fuse. These devices can sense and shut off current by heating a layer inside the PTC if the amount of current passing exceeds a threshold. The PTC device is reset once this current falls and the device cools.

In addition, in accordance with an embodiment, the battery pack can contain a thermistor that the mobile device checks through one other connector on the battery pack to monitor the health of the pack, and in some embodiments an ID chip or microcontroller that the mobile device interrogates through another connector to confirm an original battery manufacturer or other information about the battery. Other connectors and functions can be included in a battery pack to provide accurate battery status and/or charging information to a device being powered by a battery pack or a charger charging the battery pack.

Figure 8:
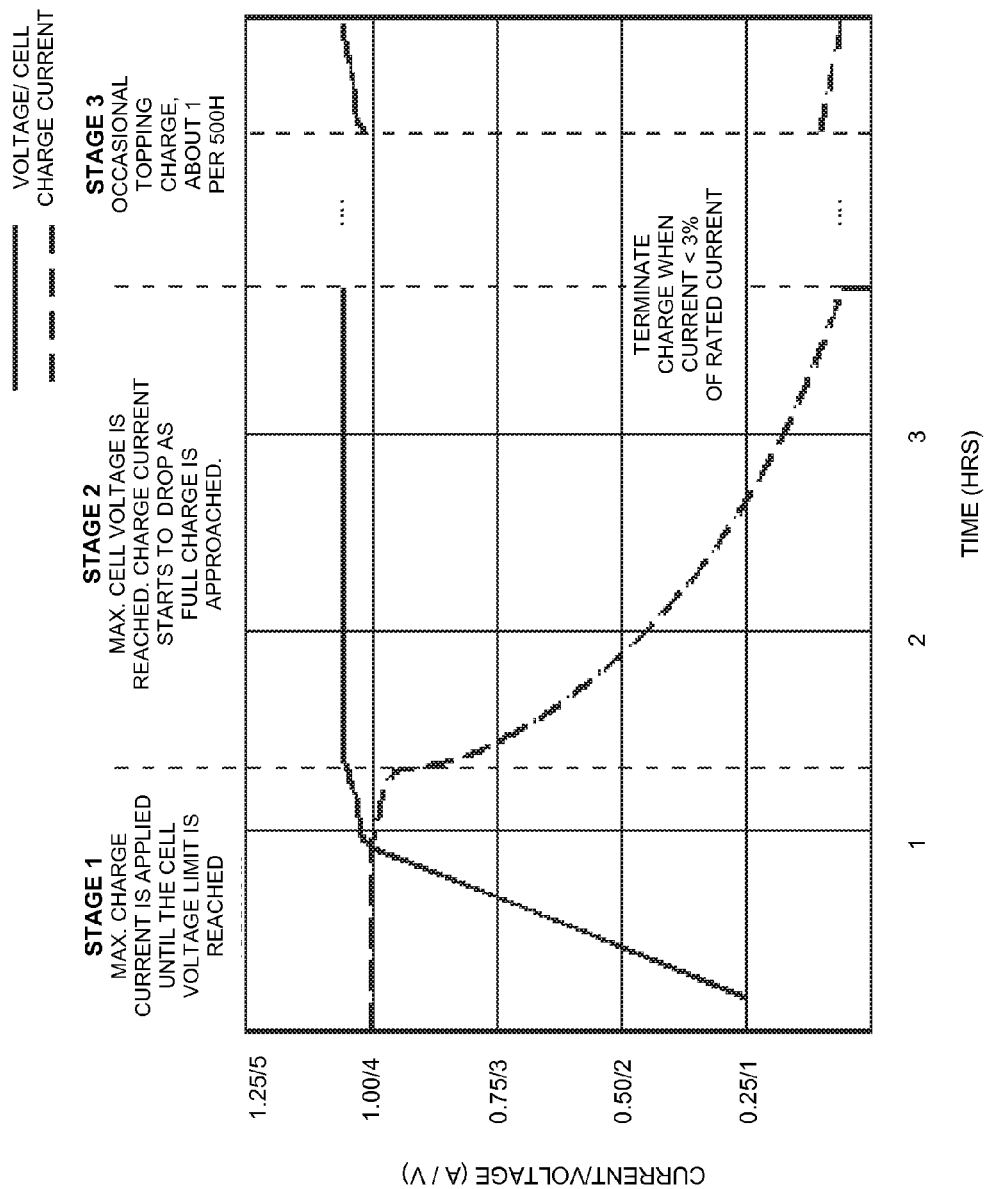
FIG. 8 illustrates a typical charge cycle for a Lithium Ion battery, in accordance with an embodiment.

In addition to the components described above, In accordance with an embodiment, the receiver circuit comprises a receiver coil that could be a wound wire or PCB coil as described above, optional electromagnetic shielding between the coil and the metal body of the battery, optional alignment assisting parts such as magnets, etc., a receiver communication circuit (such as the resistor and FET for load modulation shown in FIGS. 2 and 4), a wireless power receiver (such as rectifiers and capacitors as discussed above), and an optional Battery charger IC that has a pre-programmed battery charging algorithm. Each type of battery and chemistry requires a pre-determined optimized profile for charging of a battery. A typical charge cycle for a Lithium Ion (Li-Ion) is shown in FIG. 8. Such a battery may be charged up to a value of 4.2 V at full capacity. The battery should be charged according to the guidelines of the manufacturer. For a battery of capacity C, the cell can typically be charged at the rate 1 C. In Stage 1, the maximum available current is applied and the cell voltage increases until the cell voltage reaches the final value (4.2 V). In that case, the charger IC switches to Stage 2 where the charger IC switches to Constant Voltage charging where the cell voltage does not change but current is drawn from the source to further fill up the battery. This second Stage may take 1 or more hours and is necessary to fully charge the battery. Eventually, the battery will draw little (below a threshold) or no current. At this stage, the battery is full and the charger may discontinue charging. The charger IC can periodically seek the condition of the battery and top it off further if the battery has drained due to stand-by, etc.

Such multiple stages of battery charging may be implemented in firmware with the wireless power charger and receiver microcontrollers monitoring the battery cell voltage, current, etc. and working in tandem and to provide appropriate voltage, current, etc. for safe charging for any type of battery. In another approach as shown in FIG. 6, a battery charger IC chip that has specialized battery charging circuitry and algorithm for a particular type of battery can be employed. These charger ICs (with or without fuel gauge capability to accurately measure battery status, etc.) are available for different battery chemistries and are included in most mobile devices with mobile batteries such as mobile phones. They can include such safety features as a temperature sensor, open circuit shut off, etc. and can provide other circuits or microcontrollers such useful information as end of charge signal, signaling for being in constant current or voltage (stage 1 or 2 above, etc.). In addition, some of these ICs allow the user to program and set the maximum output current to the battery cell with an external resistor across 2 pins of the IC.

In accordance with an embodiment, the wirelessly charged battery pack in addition includes a micro-controller that coordinates and monitors various points and may also include thermal sensors on the wireless power coil, battery cell and/or other points in the battery pack. The microcontroller also may communicate to the charger and can also monitor communication from the charger (in case of bi-directional communication). Typical communication through load modulation is described above.

Another aspect of a wirelessly charged battery pack is the optional external/internal switch. A battery pack may receive power and be charged wirelessly or through the connectors of a battery pack. For example when such a battery pack is used in a mobile phone, the user may wish to place the phone on a wireless charger or plug the device in to a wired charger for charging or charge the device as well as synchronize or upload and/or download information. In the second case, it may be important for the battery pack to recognize current incoming to the battery pack and to take some sort of action. This action may include notifying the user, shutting off the wired charger by a switch or simply shutting down the charger IC and sending a signal back through the microcontroller and modulating the current back to the charger that a wired charger is present (in case priority is to be given to the wired charger) or conversely to provide priority to the wireless charger and shut off wired charger access to battery when the wireless charger is charging the battery. At either case, a protocol for dealing with presence of two chargers simultaneously should be pre-established and implemented in hardware and firmware.

As shown in FIG. 6, the wireless charging of battery occurs with current flowing into the battery through the battery contacts from the mobile device. Typically, such current is provided by an external DC supply to the mobile device (such as an AC/DC adaptor for a mobile phone) and the actual charging is handled by a charger IC chip or power management IC inside the mobile device that in addition to charging the battery, measures the battery's state of charge, health, verifies battery authenticity, and displays charge status through LEDs, display, etc. to a user. It may therefore be advantageous to include a current sense circuit at one of the battery pack contacts to measure and sense the direction of current flow into or out of the battery. In case the current is flowing in (i.e. battery being externally charged through wired charging through a mobile device), the micro-controller may take the actions described above and shut off wireless charging or conversely, provide priority to wireless charging and if it is present, not allow wired charging to occur as preferred by design.

In accordance with an embodiment, the firmware in the receiver micro-controller is a key element in the operation of this battery pack. The micro-controller can measure voltages and currents, flags, and temperatures at appropriate locations for proper operation. In accordance with one embodiment, by way of example, the micro-controller can measure the value of Vout from the rectifier circuit and attempt to keep this constant throughout the charging cycle thereby providing a stable regulated DC supply to the charger IC chip. The micro-controller can send back the value of this voltage or error from a desired voltage (for example 5V) or simply a code for more or less power back to the charger in a binary or multi-level coding scheme through a load modulation or other scheme (for example RF communication as described earlier) back to the charger. The charger can then take action through adjustment of input voltage to the charger coil, adjustment of the frequency or duty cycle of the ac voltage applied to the charger coil to bring the Vout to within required voltage range.

The micro-controller throughout the charging process, in addition, monitors the end of charge and/or other signals from charger and/or protection circuit and the current sense circuit (used to sense battery pack current direction and value) to take appropriate action. Li-ion batteries for example need to be charged below a certain temperature for safety reasons. It is therefore essential to monitor the cell, wireless power receiver coil or other temperature and take appropriate action such as terminate charging or lower charging current, etc. if a certain maximum temperature is exceeded.

It is important to realize that during charging, as shown in FIG. 8, the battery cell voltage increases from 3 V or lower, to 4.2 V, as it is charged. The $V_{out}$ of the wireless power receiver is input to a charger IC and if this $V_{out}$ is kept constant (for example 5V), a large voltage drop (up to 2 V or more) can occur across this chip especially during Stage 1 where maximum current is applied. With charging currents of up to 1 A, this may translate to up to 2 Watts of wasted power/heat across this IC that may contribute to battery heating. It may be therefore preferable to implement a strategy whereby the $V_{out}$ into the charger IC tracks the battery voltage thereby creating a smaller voltage drop and therefore loss across the charger IC. This can provide a significant improvement in performance since thermal performance of the battery pack is very important.

The communication between the receiver and charger needs to follow a pre-determined protocol, baud rate, modulation depth, etc. and a pre-determined method for handshake, establishment of communication, and signaling, etc. as well as optionally methods for providing closed loop control and regulation of power, voltage, etc. in the receiver.

Figure 9:
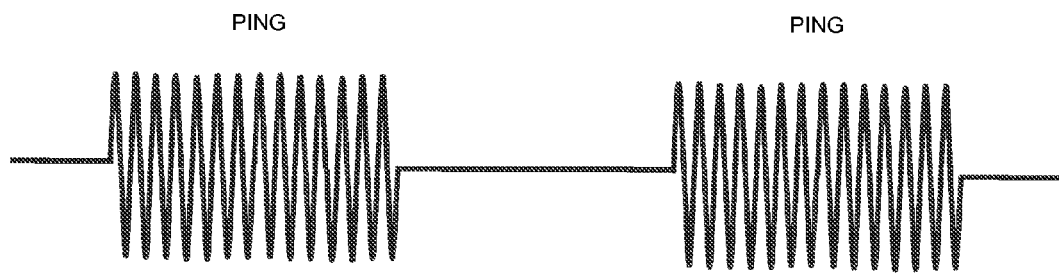
FIG. 9 illustrates how the charger periodically activates the charger coil driver and powers the charger coil with a drive signal of appropriate frequency, in accordance with an embodiment.

In accordance with an embodiment, a typical wireless power system operation can be as follows: As shown in FIG. 9, the charger periodically activates the charger coil driver and powers the charger coil with a drive signal of appropriate frequency. During this 'ping' process, if a receiver coil is placed on top or close to the charger coil, power is received through the receiver coil and the receiver circuit is energized. The receiver microcontroller is activated by the received power and begins to perform an initiation process whereby the receiver ID, its presence, power or voltage requirements, receiver or battery temperature or state of charge and/or other information is sent back to the charger. If this information is verified and found to be valid, then the charger proceeds to provide continuous power to the receiver. The receiver may alternately send an end of charge, over-temperature, battery full, or other messages that will be handled appropriately by the charger and actions performed. The length of the ping process should be planned to be of sufficient length for the receiver to power up its microcontroller and to respond back and for the response to be received and understood. The length of time between the pings is determined by the designer. If ping process is performed often, the stand-by power use of the charger is higher. Alternately, if the ping is done infrequently, the system will have a delay before the charger discovers a receiver nearby.

Alternately, the ping operation can be initiated upon discovery of a nearby receiver by other means. This provides a very low stand-by power use by the charger and may be performed by including a magnet in the receiver and a magnet sensor in the charger or through optical, capacitive, weight or other methods for detection. Alternatively, the system can be designed to be always ON (i.e. the charger coil is powered at an appropriate drive frequency) and presence of the receiver coil brings the coil to resonance with the receiver coil and power transfer occurs. The receiver in this case may not even contain a microcontroller and act autonomously and simply have a regulator to provide regulated output power to a device, its skin or case, or battery.

Figure 10:
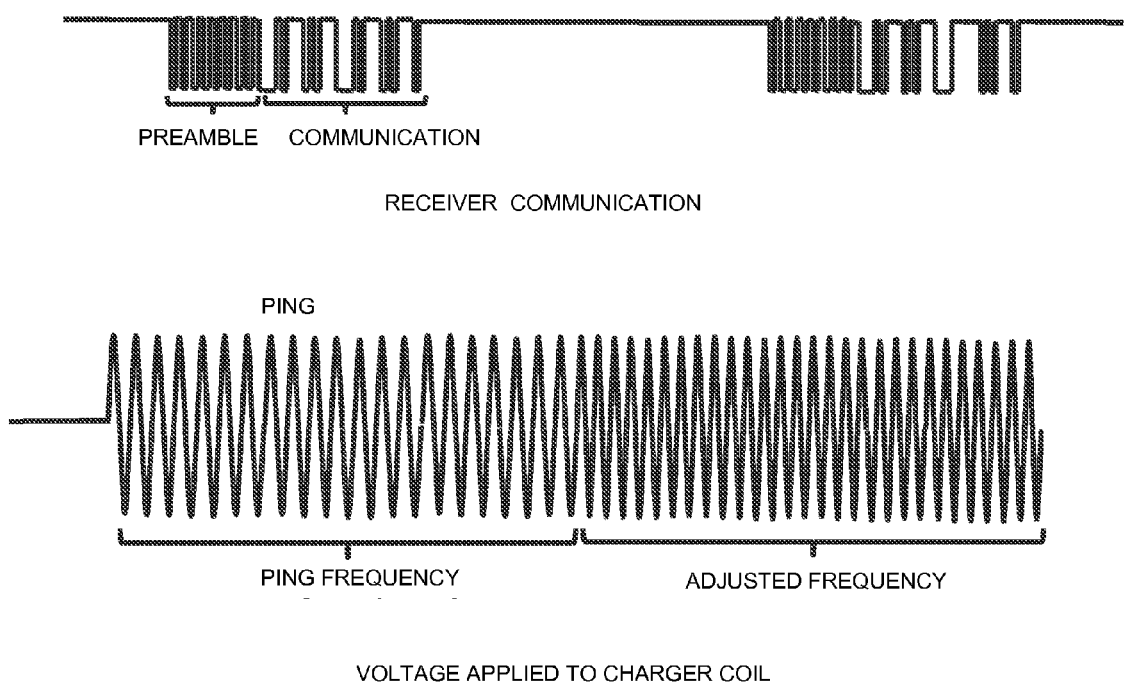
FIG. 10 illustrates an example of the communication process and regulation of power and/or other functions, in accordance with an embodiment.

In accordance with an embodiment, the protocol for communication can be any of, e.g. common RZ, NRZ, Manchester code, etc. used for communication. An example of the communication process and regulation of power and/or other functions is shown in FIG. 10. As discussed above, the charger may periodically start and apply a ping voltage of pre-determined frequency and length to the charger coil (bottom figure in FIG. 10). The receiver is then activated and may begin to send back communication signals as shown in top of FIG. 10. The communication signal can include an optional preamble that is used to synchronize the detection circuit in the charger and prepare it for detection of communication. A communication containing a data packet may then follow, optionally followed by checksum and parity bits, etc. These processes are quite standard in communication systems and similar techniques can be followed. The actual data packet can include information such as an ID code for the receiver, received voltage, power, or current values, status of the battery, amount of power in the battery, battery or circuit temperature, end of charge or battery full signals, presence of external wired charger, or a number of the above. Also this packet may include the actual voltage, power, current, etc. value or the difference between the actual value and the desired value or some encoded value that will be useful for the charger to determine how best to regulate the output.

Alternatively, the communication signal can be a pre-determined pattern that is repetitive and simply lets the charger know that a receiver is present and/or that the receiver is a valid device within the power range of the charger, etc. Any combination of systems can be designed to provide the required performance.

In response to the receiver providing information regarding output power or voltage, etc. the charger may modify voltage, frequency, duty cycle of the charger coil signal or a combination of the above. The charger can also use other techniques to modify the power out of the charger coil and to adjust the received power. Alternatively the charger can simply continue to provide power to the receiver if an approved receiver is detected and continues to be present. The charger may also monitor the current into the charger coil and/or its temperature to ensure that no extra-ordinary fault conditions exist. One example of this type of fault may be if instead of a receiver, a metal object is placed on the charger.

The charger can adjust a parameter to increase or decrease the power or voltage in the receiver and then wait for the receiver to provide further information before changing a parameter again or it can use more sophisticated Proportional Integral Derivative (PID) or other control mechanisms for closing the loop with the receiver and achieving output power control. Alternatively, as described above, the charger can provide a constant output power, and the receiver can regulate the power through a regulator or a charger IC or a combination of these to provide the required power to a device or battery.

Various manufacturers may use different coding and also bit rates and protocol. The control process used by different manufacturers may also differ, further causing interoperability problems between various chargers and receivers. A source of interoperability differences may be the size, shape, and number of turns used for the power transfer coils. Furthermore, depending on the input voltage used, the design of a wireless power system may step up or down the voltage in the receiver depending on the voltage required by a device by having appropriate number of turns in the charger and receiver coils. However, a receiver from one manufacturer may then not be able to operate on another manufacturer charger due to these differences in designs employed. It is therefore extremely beneficial to provide a system that can operate with different receivers or chargers and can be universal.

In accordance with an embodiment, to be able to detect and power/charge various receivers, the charger can be designed such that the initial Ping signal is at such a frequency range to initially be able to power and activate the receiver circuitry in any receiver during the ping process. After this initial power up of the receiver, the charger communication circuit should be able to detect and understand the communication signal from the receiver. Many microcontrollers are able to communicate in multiple formats and may have different input pins that can be configured differently to simultaneously receive the communication signal and synchronize and understand the communication at different baud rates and protocols. The charger firmware can then decide on what type of receiver is present and proceed to regulate or implement what is required (end of charge, shut-off, fault condition, etc.). Depending on the message received, then the charger can decide to change the charger driver voltage amplitude, frequency, or duty cycle or a combination of these to provide the appropriate regulated output.

In accordance with an embodiment, the charger's behavior can also take into account the difference in the coil geometry, turns ratio, etc. For example, a charger and receiver pair from one or more manufacturers may require operation of the charger drive voltage at 150 kHz. However, if the same receiver is placed on a charger from another manufacturer or driven with different coil/input voltage combination, to achieve the same output power, the charger frequency may need to be 200 kHz. The charger program may detect the type of receiver placed on it and shift the frequency appropriately to achieve a baseline output power and continue regulating from there.

As shown in FIG. 10, after the receiver sends back a communication signal back to the charger, in response to it, the charger adjusts its frequency and then awaits further information from the receiver. The receiver acknowledges the change and as shown in the second data packet in the receiver signal, has modified its state and communicates back to the charger. This closed loop continues during the charging process.

For receivers that contain an onboard regulator for the output power, the input voltage to the regulator is not as critical since the regulator performs a smoothing function and keeps the output voltage at the desired level with any load changes. It is however, important not to exceed the maximum rated input voltage of the regulator or to drop below a level required so that the output voltage could no longer be maintained at the required value. However, in general, inclusion of a regulator and/or a charger IC chip (for batteries) reduces the power/voltage regulation requirements at the expense of the additional size and cost of this component.

While the system above describes a system where the communication is primarily through the coil, as described earlier, communication may be implemented through a separate coil, RF, optical system or a combination of the above. In such circumstances, a multi-protocol system can also be used to interoperate between systems with different communication and/or control protocols or even means of communication.

Alternately, the receiver may be designed to accommodate different types of chargers. For example, once a receiver is awakened by a charger, it may try to detect the ping frequency used by the charger. This may be done by any number of phase locking or other techniques. Alternately, the receiver may send back a variety of trial communication signals during ping process to establish which type of device is performing the ping. Once the type of the charger is established, the receiver can proceed and communicate with the appropriate communication protocol and frequency with the charger.

The multi-protocol approach described above is important for development of a universal system that can operate amongst multiple systems and provide user convenience.

The description for the systems above may use discreet electronics components or some or all of the functions described above may be integrated into an Application Specific Integrated Circuit (ASIC) to achieve smaller footprint, better performance/noise, etc. and/or cost advantages. Such integration is common in the Electronics industry and can provide additional advantages here.

Magnets for Use with Magnetically Sensitive Devices and Materials

Magnetically sensitive devices, materials, or components are used in a variety of applications in industrial, consumer, credit, debit, Identification, or loyalty cards, computer, MP3 players, cameras, medical, satellite, marine, mining, transport, and military applications. Examples of magnetically sensitive components or sensors include traditional or electronic compasses, Hall sensors, magnetometers, disk drives, speakers, rotational or linear encoders, pneumatic sensors, electric motor position sensors, etc. These sensors monitor and/or measure slight amounts of magnetic field. For example, a traditional or electronic compass (consisting of magnetometer or Hall Effect sensors) responds to the small magnetic field of the earth to provide directional information to the user. Use of a magnet near such a device would alter its performance and reliability. However, there are instances where such a use would be beneficial. As an example, recently, there is interest in incorporation of electronic compasses in mobile devices such as phones, GPS, cameras, electronic tablets, and electronic compasses to provide the user a portable navigation capability. Simultaneously, these devices have often used magnets to secure the device in a holder, case, or holster or to attach the device to a surface such as a holder in a car. One example of use of magnets in mobile phones is in certain phones, such as Blackberry-type phones, where the presence of a device in its holster containing a small magnet is detected by a magnetic sensor in a phone and activates certain actions that may be selectable by the user on the phone. These actions can for example consist of turning the ringer on the phone off or switching to a vibrate mode.

In cases such as the phone described above, if a magnetic compass is implemented in the phone, the presence of a magnet in a case can interfere with the operation of the compass and/or navigation capabilities of the device. Another example is the often used magnetic discs or clasps in cases or holders for phones or cameras to close a protective cover on a mobile device, phone, computer, GPS device, etc. In these and many other cases, it is desired to have an easy method of fastening two parts together magnetically while not affecting the operation of the device or system.

Figure 11:
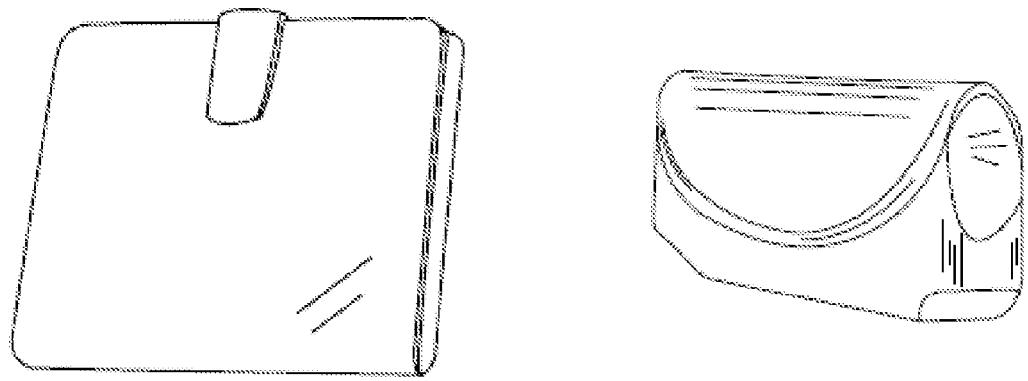
FIG. 11 shows a Notebook-style portfolio case and a mobile phone or camera pouch, where magnets are used to secure a closing clasp or flap, in accordance with an embodiment.

FIG. 11 shows a Notebook-style portfolio case (left) and a mobile phone or camera pouch (right), where magnets are used to secure a closing clasp or flap. Magnets have also been used to secure cases or portfolios to Notebook computers or the back of their screens. These devices often incorporate components such as disk drives or magnetically sensitive components such as compasses, etc. that may be affected by use of such magnets. In addition, the existing magnetic sensors in the device (as in the blackberry phone case discussed above) may be affected by such magnets.

Figure 12:
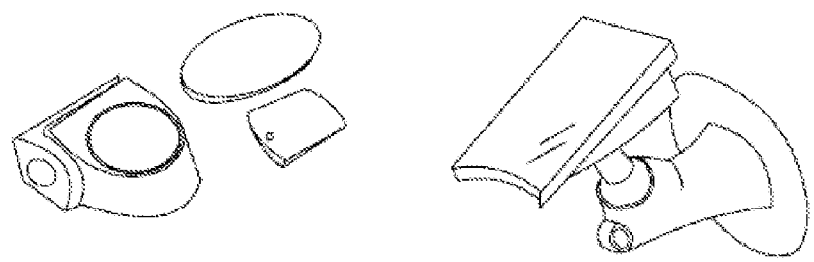
FIG. 12 illustrates several commercially available mounts for devices, in accordance with an embodiment.

In addition, in many instances, it is desirable to hold or mount various devices securely by use of magnets. These can include having a convenient method for mounting of mobile phones, MP3 players, cameras, radar detectors, GPS units, compass, video screens, TVs, etc. in cars, boats, ships, trains, planes, helicopters, or other transport vehicles or work or home areas. Several commercially available mounts for such devices are shown in FIG. 12. In these instances, a magnetic or ferromagnetic base unit is coupled with a magnetic or ferromagnetic matching thin sticker or small sheet that can be attached or inserted inside a mobile device or its battery compartment or incorporated into a skin or case for the device such that the device will be attracted to the base and be held firmly during use or for storage. One or the other or both the holder or the mount and the other part incorporated into or on a device can be magnetic, to provide the necessary attractive force for this operation. Similarly, if the device is sensitive to magnetic fields, such a magnet can interfere with its operation.

Another area of use of magnets is in design of handbags, bags, backpacks, wallets, money clasps, etc. where magnets are used as a convenient method of closing or fastening parts to close or shut parts together. Use of magnets in such instances where the user may place a magnetically sensitive device, phone, camera, MP3 player with disk drive, GPS unit, compass, or credit cards, etc. may cause problems. In particular, erasure of data in credit cards due to use of magnets in wallets or handbags can be a concern.

Figure 13:
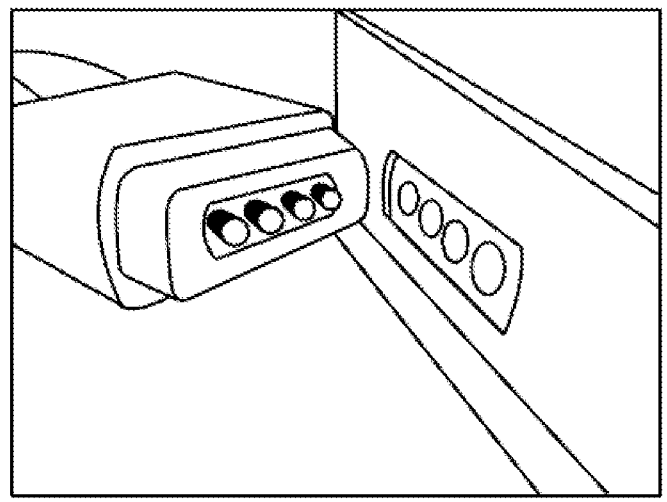
FIG. 13 shows an example of a power plug for an electronic device, in accordance with an embodiment.
Figure 13:
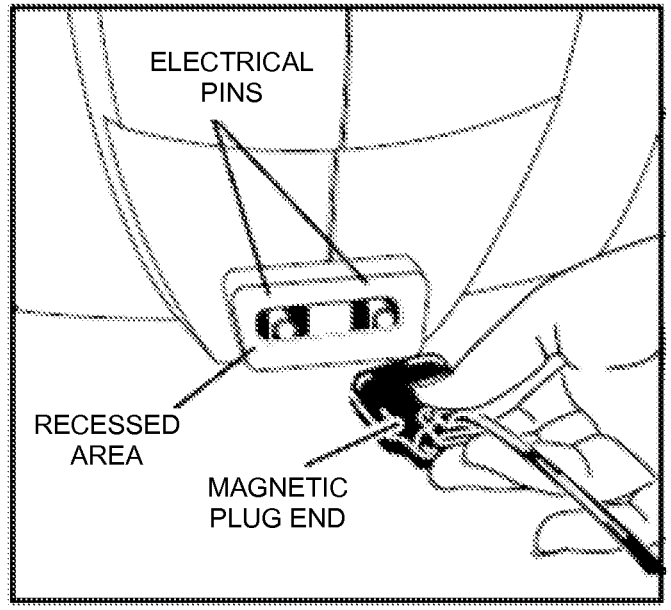

More recently, magnets have been used to provide easy and safe connectivity between power or data cables and mobile devices or Notebook computers. As shown in FIG. 13 and described, for example in U.S. Pat. Nos. 7,311,526 and 7,645,143, a power plug for an electronic device or Notebook computer or deep fryer using a magnetic method for fastening and attachment of the power cable and its plug to the matching connector in the Notebook and a deep fryer. The magnet or ferromagnet material in the part of the plug surrounding the 5 connectors shown is attracted to the matching part in the Notebook and automatically aligns and connects the connectors in the 2 parts. The magnetic element on one or both of the plug and the device connector or receptacle can be a magnet to provide the necessary attractive force. The advantages of this type of connector is that in case a user accidentally trips over such a cable, it would easily pull the cable out of the Notebook computer or deep fryer without damage to either side and pulling the product off to the floor causing damage or injury. This is a considerable advantage over other types of connectors that are mated by force and insertion of one part into another and liable to break in case of such accidents or cause unnecessary damage or injury. However, similar to the situations described above, use of such types of magnets near devices that are sensitive to the magnetic field such as mobile phones with compasses or devices with magnetic sensors or hard drives near the connector is problematic and therefore similar connectors are not used in many devices that can take advantage of this technology.

Another area of use of magnets is in the area of wireless power. With the proliferation of mobile devices in recent years, the area of powering and charging these devices has attracted more attention. The vast majority of the electronic devices in use today are powered and/or charged through conduction of electricity through wires from a power supply or charger to the device. While this method has proven to be efficient for most stationary devices, recently, there has been an interest in providing wireless methods for powering or charging several mobile devices, batteries, or electronics devices. The advantages include the ability to eliminate a power/charger cord and the possibility of implementing a universal charger/power supply that is able to charge/power multiple devices one at a time or simultaneously. In addition, in many situations, eliminating the connectors for charging and/or power would improve device and/or battery reliability. The so called "wireless power" methods can also be generally divided into conductive and inductive methods. While the conductive methods use flow of current from a charger into the mobile devices and/or battery to provide power and therefore are not strictly speaking wireless, they offer geometries where a user can place a device on a pad or similar object and receive power through matching contacts on the back of a device and the pad without 'plugging in' the device. The inductive methods utilize coils or wires near the surface of a charger to create a magnetic field in the vicinity of the surface. A coil or wire in a receiver embedded into a device or battery that is in the vicinity of the surface can sense the magnetic field. Power from the charger can be transferred to the receiver without any wired connection through air or other media in between. The inductive method has several advantages over the conductive approach, such as:

- Connectors that are a major failure point in electronics are eliminated.
- Environmentally hermetic devices can be developed that are immune to moisture or liquids.
- The receiver can be built directly on the battery so the battery can be charged through the outside shell of the device by induction. This enables changing the battery of any existing product after-market with a similar sized and shaped battery to enable inductive charging.
- With a properly designed charger pad, the charging is independent of position and does not require placement of device in any particular location or orientation.

Methods based on an array of connectors (e.g. U.S. Pat. No. 6,913,477 B2) or strips of power (e.g. www.pureenergy.com) in a pad that can power mobile devices conductively have been proposed. Sakamoto (H. Sakamoto and K. Harada in PESC'93 Record, pp 168-174, Spain, (1992)) has also shown the possibility of recharging a device through a transformer coil with a core where the sections of the transformer can be separated. S. Hui, et al., in Electronics Letters, 34, pp. 1052-1054, (1998) and S. Tang, et al., Electronics Letters, 36, pp 943-944 (2000), describe the use of coreless printed circuit board transformers. Fernandez, et al., in Proc. APECOZ, 2002, pp. 339-345, have described the process of optimization of PCB coils for power transfer. The use of a resonance circuit is described in U.S. Publication No. 2009/0015075 and U.S. Publication No. 2009/0033564.

As described herein, powering or charging of a mobile or electronic device or battery can be used interchangeably. Many mobile devices incorporate rechargeable batteries and require external DC power to charge these batteries for operation. However, in case of some devices such as a notebook, computer, etc., while the device is connected to DC power to charge its internal battery, the device can also be using the DC power to operate simultaneously. The ratio of power used for charging the internal rechargeable battery to operating the device depends on the degree to which the battery is discharged, the power necessary to operate the device, and what the device is doing at any given time. In the extreme, a laptop with its battery removed can only use the DC power to operate. In this case no charging occurs and 100% of the provided DC power is used to operate the device.

In some of the applications described above, magnets can be used to provide alignment or a secure connection for an electrical contact. For example, in some implementations of the inductive charging technology, it may be desirable to provide alignment between the charger and receiver coils by aligning them through use of disk, ring, or other magnets attached to the two coils. When a receiver embedded in a device, battery, battery door, skin, or case is brought close to a charger surface, the corresponding magnets can attract and bring the coils to the necessary alignment for optimum power transfer. Several embodiments for implementing this, for example to provide higher insensitivity to placement of the receiver, better mechanical and smaller volume requirements, minimal impact on power transfer, etc., are described in U.S. patent applications "INDUCTIVE POWER SOURCE AND CHARGING SYSTEM", application Ser. No. 11/669,113, filed Jan. 30, 2007 (subsequently published as U.S. Publication No. 20070182367, and issued as U.S. Pat. No. 7,952, 322); "POWER SOURCE, CHARGING SYSTEM, AND INDUCTIVE RECEIVER FOR MOBILE DEVICES", application Ser. No. 11/757,067, filed Jun. 1, 2007 (subsequently published as U.S. Publication No. 20070279002, and issued as U.S. Pat. No. 7,948,208); "SYSTEM AND METHOD FOR INDUCTIVE CHARGING OF PORTABLE DEVICES", application Ser. No. 12/116,876, filed May 7, 2008 (subsequently published as U.S. Publication No. 20090096413); and "SYSTEM AND METHODS FOR INDUCTIVE CHARGING, AND IMPROVEMENTS AND USES THEREOF"; application Ser. No. 12/769,586, filed Apr. 28, 2010 (subsequently published as U.S. Publication No. 20110050164), each of which applications are hereby incorporated by reference herein.

Figure 14:
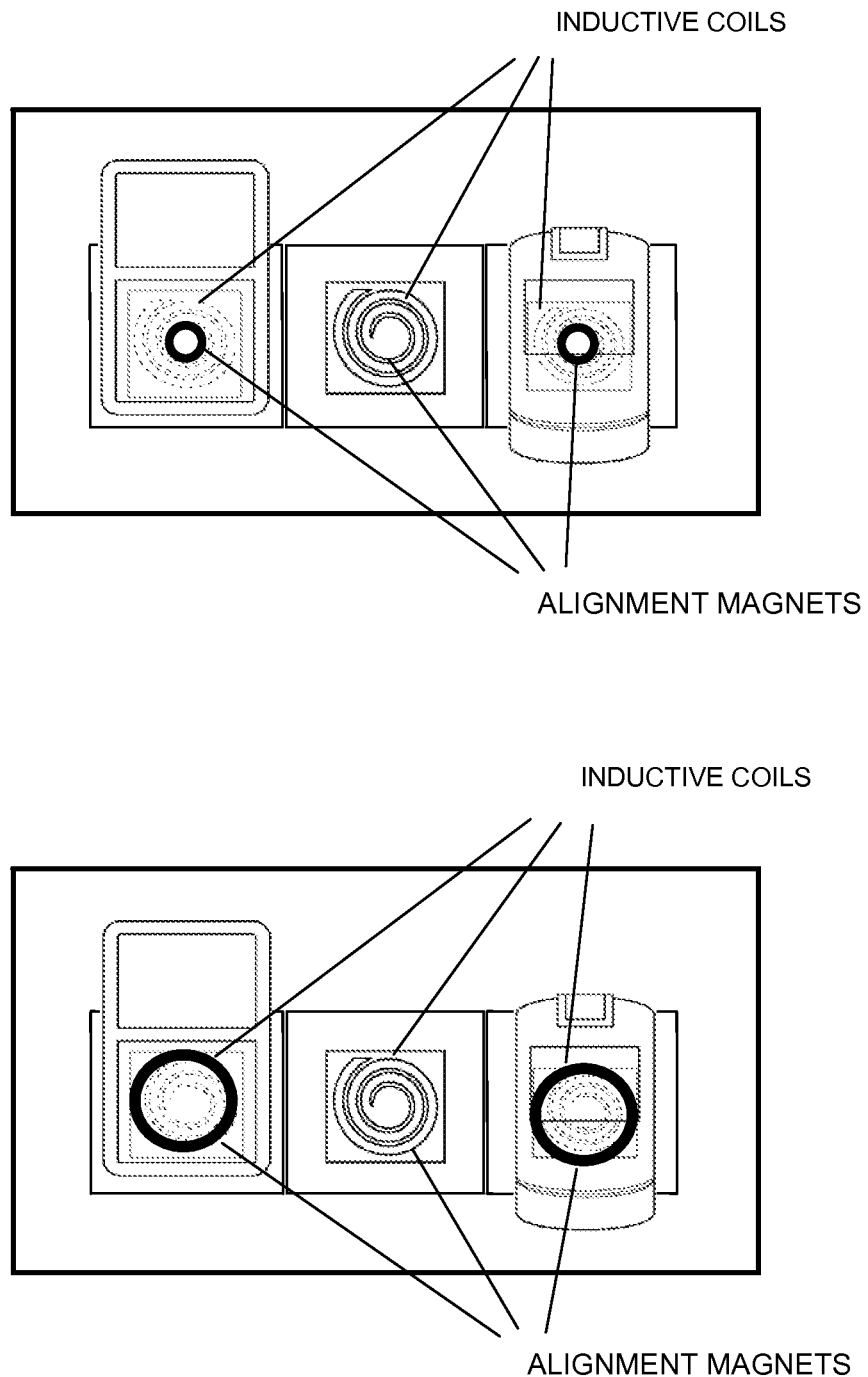
FIG. 14 shows an inductive wireless charger and/or power supply with multiple charging stations, in accordance with an embodiment.
Figure 15:
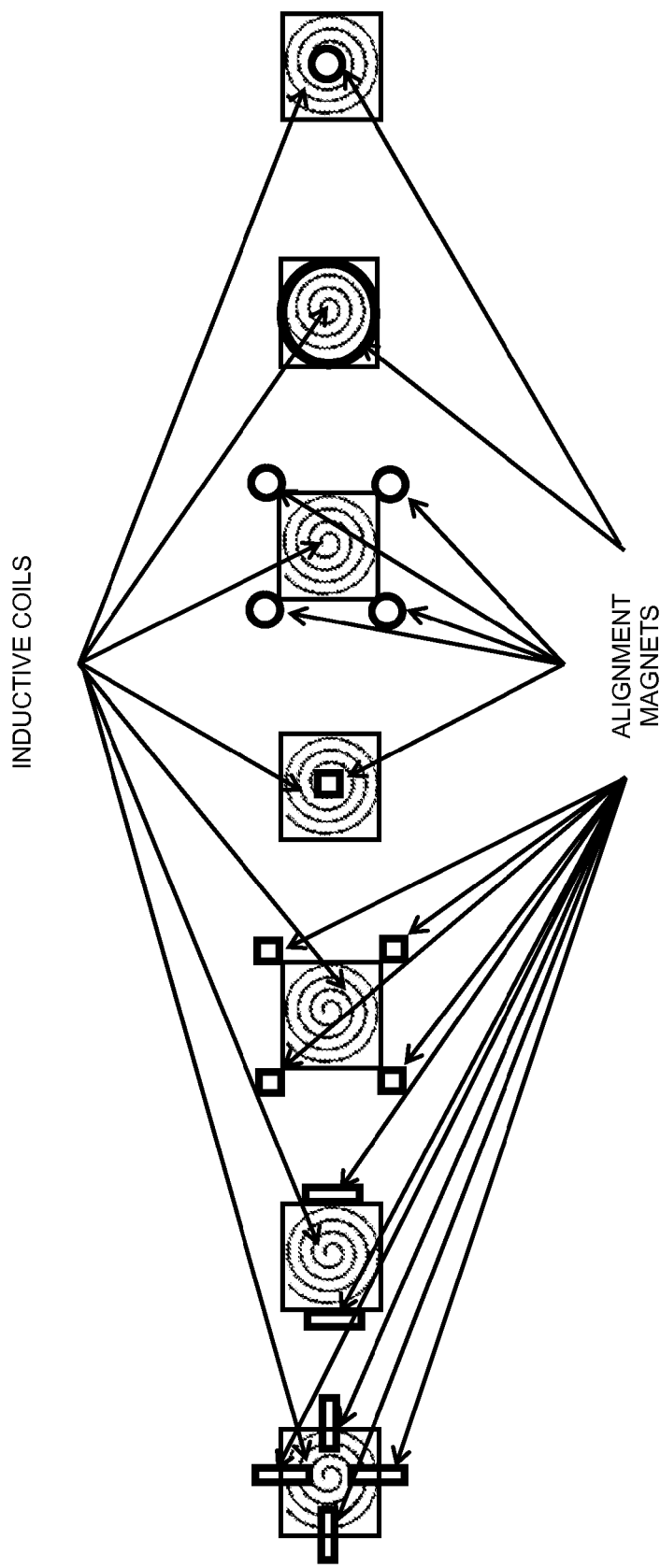
FIG. 15 illustrates several different placements and shapes for magnets, in accordance with an embodiment.

FIG. 14 shows an Inductive wireless charger and/or power supply with multiple charging stations in accordance with an embodiment. The inductive receiver can be incorporated into a mobile device, its battery door, case or skin, a battery, etc. To align the coil in the charger and the coil in the receiver, magnets that attract the coils into alignment can be incorporated or on around the coils. Many types of magnets such as round discs, square, ring, oval, rectangular, arc, etc. can be used for alignment of coils. In FIG. 14, round disc (top) and ring (bottom) magnets are used for this alignment. One or many magnets can be used. Several different placements and shapes for magnets are shown in FIG. 15 by way of example. For example, a single disc or square, or other shaped magnet at the center of each coil can be used. In other implementations, 4 disc or square magnets placed in the corners of a square pattern can be used or other patterns. The patterns shown herein are shown by way of example. In accordance with other embodiments, other numbers and/or shapes of magnets or magnetization direction or strength can be used to achieve the desired alignment. It is possible to incorporate magnets with attracting magnetic orientation in the two parts to be aligned or alternatively, only one or one set of magnets and a ferromagnetic or magnetically attractable material used in the other part to achieve similar alignment results.

The advantage of use of a single disc magnet in the center of a charger and one in the center of a receiver is that the receiver can rotate with respect to the charger and still maintain optimum alignment. With 4 magnets placed as shown in FIG. 15, the coils can be rotated 90, 180, or 270 degrees with respect to each other and still maintain alignment. Other shapes or number of magnets can be used and patterns in FIG. 15 are shown only as a way of example. The magnets can be magnetized with the magnet direction perpendicular to the face of the disk or magnet and by using magnet poles in the charger and receiver such that the pole is In the same direction in both, for example as south pole out of the page. When the two devices are close to each other, the magnets attract and align the coils. U.S. patent applications "INDUCTIVE POWER SOURCE AND CHARGING SYSTEM", application Ser. No. 11/669,113, filed Jan. 30, 2007 (subsequently published as U.S. Publication No. 20070182367, and issued as U.S. Pat. No. 7,952,322); "POWER SOURCE, CHARGING SYSTEM, AND INDUCTIVE RECEIVER FOR MOBILE DEVICES", application Ser. No. 11/757,067, filed Jun. 1, 2007 (subsequently published as U.S. Publication No. 20070279002, and issued as U.S. Pat. No. 7,948,208); "SYSTEM AND METHOD FOR INDUCTIVE CHARGING OF PORTABLE DEVICES", application Ser. No. 12/116,876, filed May 7, 2008 (subsequently published as U.S. Publication No. 20090096413); and "SYSTEM AND METHODS FOR INDUCTIVE CHARGING, AND IMPROVEMENTS AND USES THEREOF"; application Ser. No. 12/769,586, filed Apr. 28, 2010 (subsequently published as U.S. Publication No. 20110050164), each of which applications are hereby incorporated by reference herein, each of which applications are hereby incorporated by reference herein, previously described improvements on the design of alignment magnets. For example, in FIG. 15 or FIG. 16, disc, square, rectangular, or ring magnets are used in the charger and the receiver with the magnets magnetized in the direction perpendicular to the flat surface. A gap in the ring magnet is incorporated to reduce potential eddy currents due to changing magnetic field of the wireless charger/power supply. Ring magnets have better performance for these applications due to the larger diameter of the magnet that can be used in this case (thereby providing a larger alignment target for the user), the ability to rotate one coil with respect to the other one at any angle and maintain alignment, and the ability to reduce or eliminate any potential eddy currents through a cut in the ring as described above. In accordance with other embodiments, other shapes or combinations of shapes, such as square, rectangle, circle, oval, or triangle, etc. rins or other narrow wall, or others or combination of the above can be used depending on the particular needs of the intended application.

In some situations, the charger/and or power supply is incorporated into a mobile device or part that includes a magnetically sensitive portion. For example, the charger can be incorporated into a notebook or laptop or computer with a disk drive, compass, or other magnetically sensitive parts. In these instances, incorporation of the magnet or magnets in the charger as well as the receiver can pose problems for the device incorporating the charger as well as for the device or part incorporating the receiver.

In accordance with various embodiments, the coils described here can be manufactured with wires, Litz wire, Printed circuit board (PCB), stamped, formed, shaped, etc. metal or magnetic material. The spiral patterns shown here are for example only and the coils can be any shape or size or pattern that could generate a magnetic field.

Similarly, the alignment can be achieved between a magnet or magnets incorporated into or around one of the coils and a part constructed of ferromagnetic or other magnetic material that can be attracted to the magnet for alignment. The magnet or the magnetically attracted part can be made from Nickel, Iron, Cobalt, gadolinium and dysprosium, steel, etc. or an alloy of these materials or ceramic, Alnico, Ticonal, Rare Earth magnets, flexible or injection molded or nano-crystalline magnets so that the magnets on the receiver attract and attach to the magnetic or ferromagnetic material on the other part. Examples of metal or magnetic material or ferromagnetic material that could form the opposite side are Nickel, Steel, cobalt, gadolinium and dysprosium, steel, etc. or an alloy of these material or ceramic, Alnico, Ticonal, Rare Earth magnetic material, flexible or injection molded or nano-crystalline materials or any other material that can be attracted to a magnet or an alloy containing such. Of course, either the receiver or charger can incorporate a magnet and the other part a material that is attracted to a magnet or vice versa or both can contain magnets with poles arranged such that they attract each other for alignment. The type of materials discussed above or combination thereof can be used in any of these cases. The magnets can be permanent magnets or electromagnets activated by application of an electrical current.

Similarly, in conductive types of wireless or wire free charging or power, the connectors on a receiver in or on a device or skin, etc. are often magnetized to attract strips of metal or additional magnets on a pad to make a strong connection. For example, some companies produce a conductive type of so called "wireless" or "wire-free" charger. In some instances, connectors on the back of a mobile device incorporated into the device, its skin, or battery door, or an additional part attached to the back of the device contain a number of metallic contacts which make contact with metal strips on a pad. The metal strips are connected to a power supply rail with an applied voltage and upon contact with the receiver connectors and verification of the receiver, provide necessary voltage and/or current to the receiver. To enable a strong connection between the receiver and the pad metal strips or to enable the receiver and the device it is attached or incorporated in, to be placed at an angle or vertically, etc., the metal strips are made of a magnetic or ferromagnetic material such as Nickel, Iron, Cobalt, gadolinium and dysprosium, steel, etc. or an alloy so that the magnets on the receiver contact attract and attach to the strips. Enabling such an attractive contact is especially important when it is desired that the device not move during the charging process such as when the charger pad is used or incorporated into a car, airplane, ship, boat, etc. where motion is present. However, in instances where the mobile device contains a compass such as an electronic compass in certain phones, use of magnets in the receiver connectors interferes with such an operation. Therefore the manufacturer has generally not incorporated magnetic connectors for such instances, which eliminates the benefits of the magnetic attachment.

In these and many other applications, it may be desirable to benefit from the seemingly contradictory use of magnets for their advantages in providing an attractive force for fastening, mounting, holding, or alignment, while at the same time it is desired to minimize or eliminate any effect on magnetically sensitive components in the charger or receiver or devices or parts nearby. This contradiction can be resolved by realizing that it is possible to create magnets with a net magnetic field that is zero or small in areas near or far from the magnet and at the same time that the part retains its magnetic or attractive properties at close distances and can provide attractive forces.

To achieve small overall net magnetic field, it is important to realize that the magnetic field is a vector and fields from several magnets or parts or poles of the same magnet add to provide the total sum of the field at any location in space.

Many magnets such as Rare Earth magnets are made using a sintering process whereby the basic material components such as Iron, Nickel, Cobalt, and/or Rare Earth material are refined and then combined in the desired composition and melted in a furnace to produce starting ingots for a magnet. The ingots are then ground and the resulting particles are placed in a jig or mold with the desired shape and dimensions and pressed into shape while an external magnetic field is applied to orient the particles. By applying the appropriate magnetic field in the desired direction, in plane, out of plane, radial, or multi-pole poling of the magnet can be achieved. For example, multi-pole magnets are created by pulse magnetization. To create a linear period multi-pole magnet, a magnetizing fixture with a back and forth copper wire arrangement is used. Application of a short current pulse from a capacitor through the fixture produces a magnetic field strong enough to magnetize material in the vicinity of the wire pattern. By controlling the shape and size of the induced magnetic field various magnet types can be created. The resulting part is then treated in a sintering furnace to compact the material before further testing of the parameters and coating of the final magnet to avoid corrosion. As an example, multi-pole magnets with periodicity of 1-2 mm in substrates of 2 mm thick or less have been studied for micro-actuator applications (J. Topfer, and V. Christoph, "Multi-pole Magnetization of NdFeB Sintered Magnets and Thick Films for Magnetic Micro-Actuators", Sensors and Actuators, A 113 (2004) 257-263 AND J. Töpfer, B. Pawlowski, H. Beer, K. Plötner, P. Hofmann, M. Herfurth, "Multi-pole magnetization of NdFeB magnets for magnetic micro-actuators and its characterization with a magnetic field mapping device, J. Magn. Magn. Mater. 270 (2004) 124-129).

Figure 16:
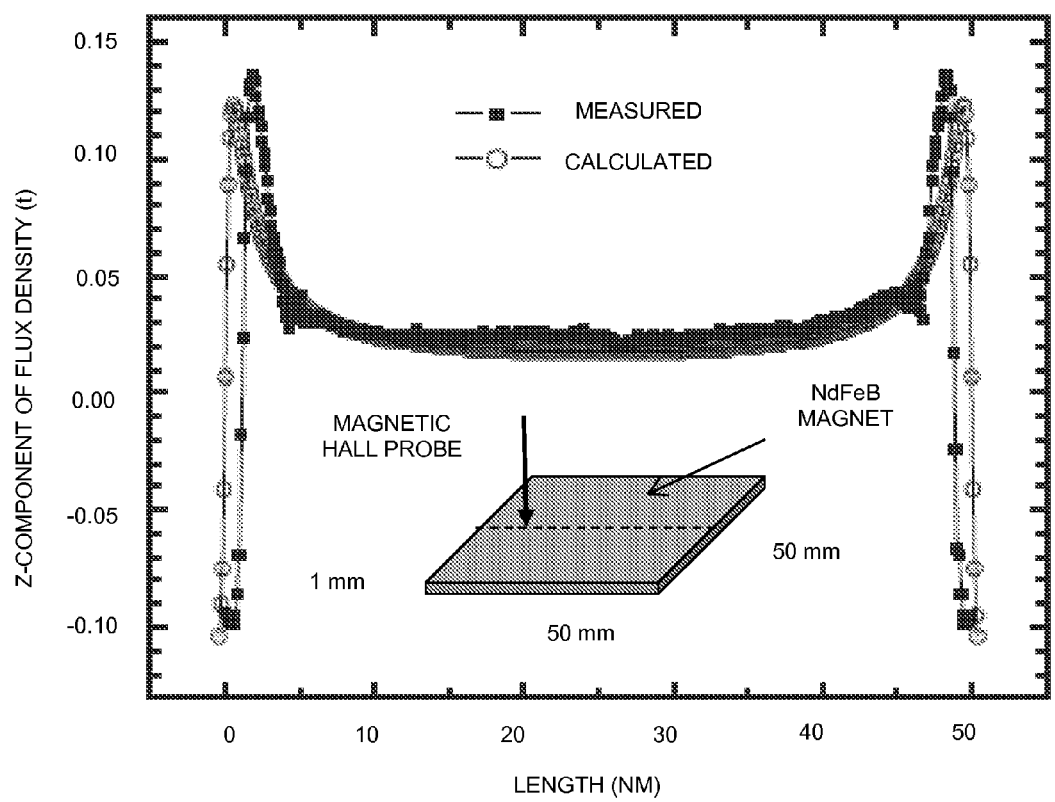
FIG. 16 shows a measured z-component along the axial direction of magnetization of a magnet, in accordance with an embodiment.

Töpfer, et al. manufactured NdFeB square magnets of 50×50×1 $mm^3$ dimension magnetized axially perpendicular to the square surface of the part and characterized it. FIG. 16 shows Measured z-component (along the axial direction of magnetization) of the magnetic flux density of this magnet measured by moving a Hall Sensor along the middle of one edge of the square to the opposite edge of the square 250 micrometers above the surface of the magnet as shown in the inset. The results show that in such a magnet, the field peaks at the edges and in the center, a strong demagnetization field exists that almost reduces the magnetic flux to zero at this center, thereby not providing much attractive or retention force for such thin magnets.

Figure 17:
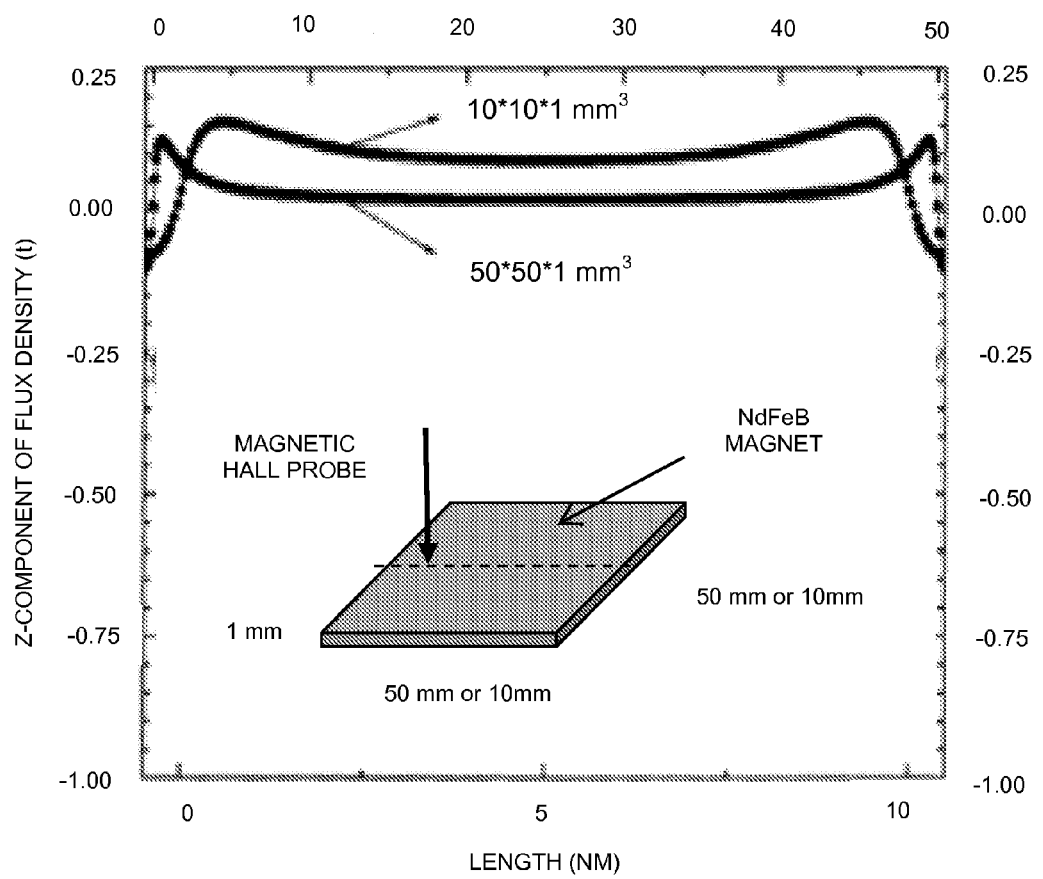
FIG. 17 illustrates the performance of a 50×50×1 $mm^3$ magnet with one of 10×10×1 $mm^3$ dimension magnetized axially perpendicular to the square surface of the part, in accordance with an embodiment.

In FIG. 17, the same researchers compare the performance of a 50×50×1 $mm^3$ magnet with one of 10×10×1 $mm^3$ dimension magnetized axially perpendicular to the square surface of the part. The smaller magnet retains its magnetic flux to a greater degree at its center and has higher peaks at the edges. Also note that the peak of the magnetic flux is higher for this magnet.

Figure 18:
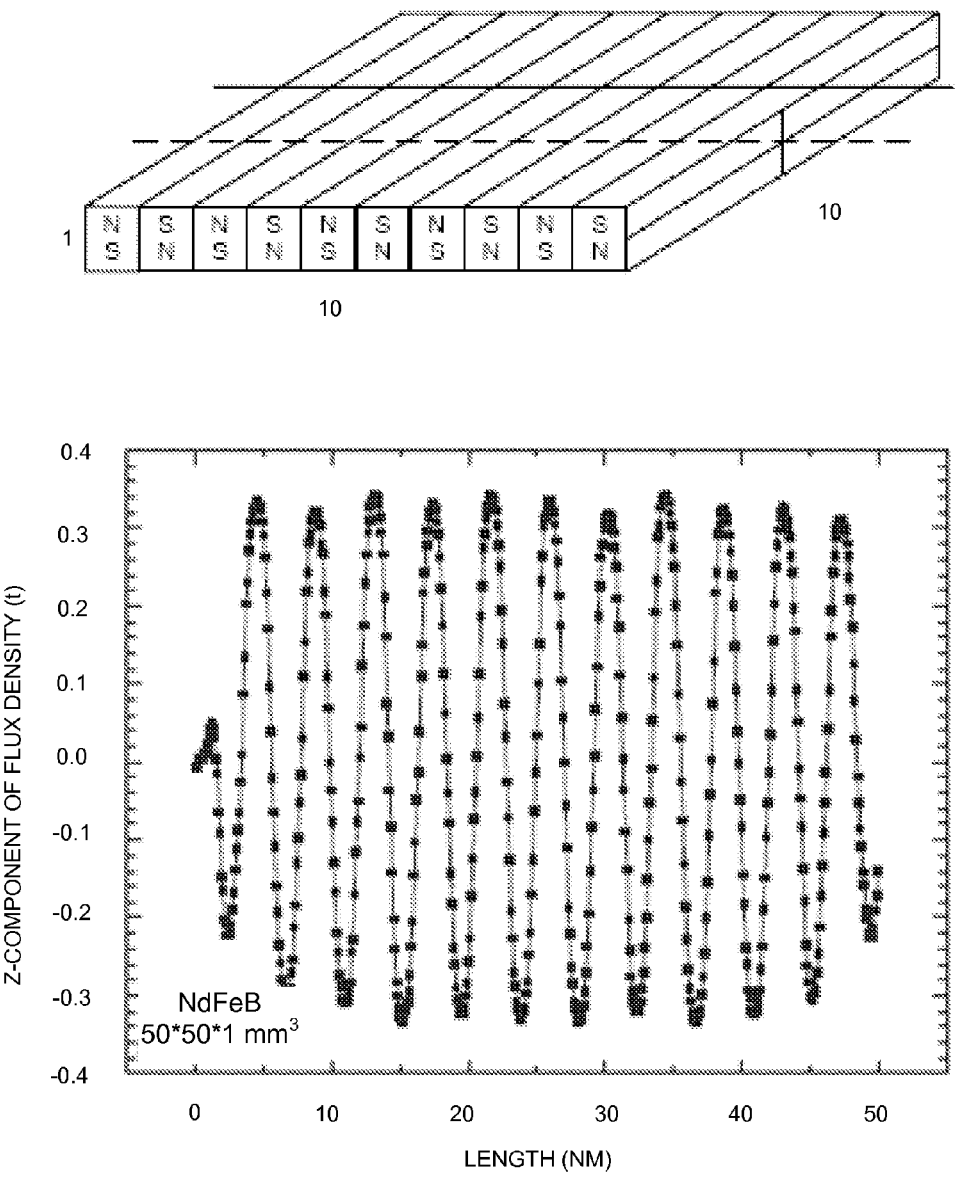
FIG. 18 illustrates how the same shape part can be periodically poled in a multi-pole pattern, in accordance with an embodiment.

To further retain high flux density in a magnet, the same shape part can be periodically poled in a multi-pole pattern as shown in FIG. 18. Here, the 10×10×1 $mm^3$ magnet is magnetized periodically with a periodicity of 2 mm as shown on the top FIG. 18. The bottom figure shows the measured magnetic flux density. It can be seen that flux density follows the poling pattern but in addition, comparing the magnitude of the flux density, it can be seen that the peak values are about twice the peak value of the flux density in a uniformly magnetized magnet. In addition, the magnetic flux does not show any sign of demagnetization and reduction of the peak values at the center of the magnet that is seen in FIGS. 16 and 17. Overall, multi-pole magnetization can provide a method for achieving higher and more uniform magnetic flux in a magnet. These characteristics are desirable for applications described here where retention and alignment of parts are required.

Figure 19:
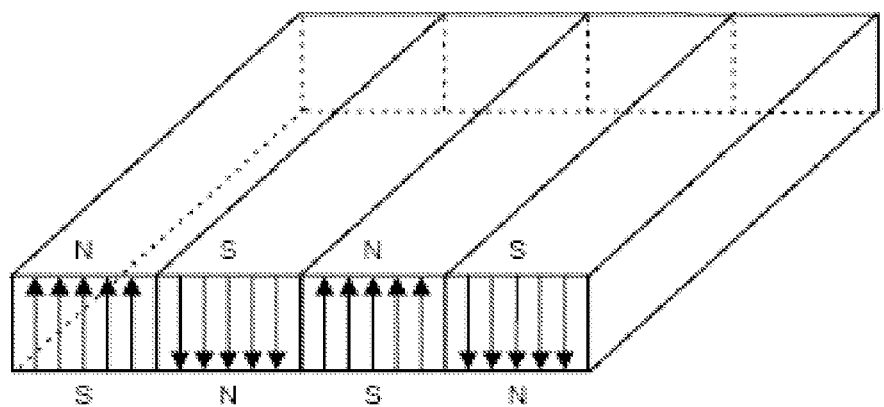
FIG. 19 shows the drop off of maximum flux density value for a 10×10×1 $mm^3$ magnet magnetized periodically with a periodicity of 1 and 2 mm, in accordance with an embodiment.
Figure 19:
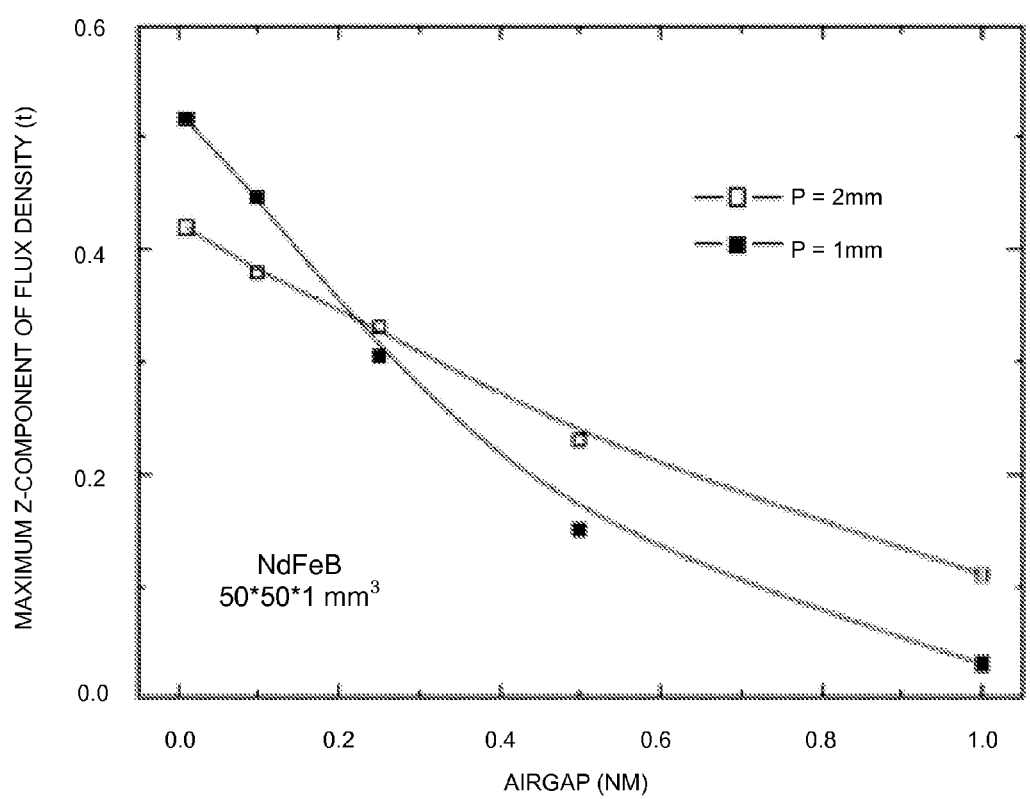

An important aspect of the performance of the multi-pole magnets described here is the performance of these magnets away from the surface of the magnets. FIG. 19 shows the drop off of maximum flux density value for a 10×10×1 $mm^3$ magnet magnetized periodically with a periodicity of 1 and 2 mm as shown on the top as a function of distance between the probe and the top of the magnet. It can be seen that the flux density drops off very quickly and reaches small values for over 1 mm. This is a result of the geometry shown on the top of the figure. With multiple poles present, as the distance between the probe and the magnet increases, the probe measures the sum of the flux density from the multiple poles present and this value approaches zero quickly away from the surface. At the same time, near the surface, the flux density is larger for the multi-pole magnet as compared to a single pole magnet, and increases as the pole periodicity increases (up to a limit given the physical dimensions of the magnet, its thickness, etc.). It is important to recall that the peak for a uniformly magnetized magnet of same dimension was only around 0.13 T (<⅓ of the 1 mm periodically poled similarly sized magnet value) as shown in FIGS. 18 and 19. At the same time, as discussed above, the uniformly magnetized magnet also showed a very significant reduction of the flux density at its center which is not present for the multi-pole magnet.

In summary, the results above demonstrate that properly designed multi-pole magnets can provide significantly higher and more uniform flux density near their surface while at the same time providing much lower flux densities away from the surface.

These characteristics can be used to provide the combination of characteristics that are useful for mounting, holding, attachment, and alignment purposes for the applications discussed earlier. By using multi-pole magnets higher retention and alignment force can be provided, while reducing the effect of any stray fields on nearby magnetically sensitive components, parts, or materials.

Figure 20:
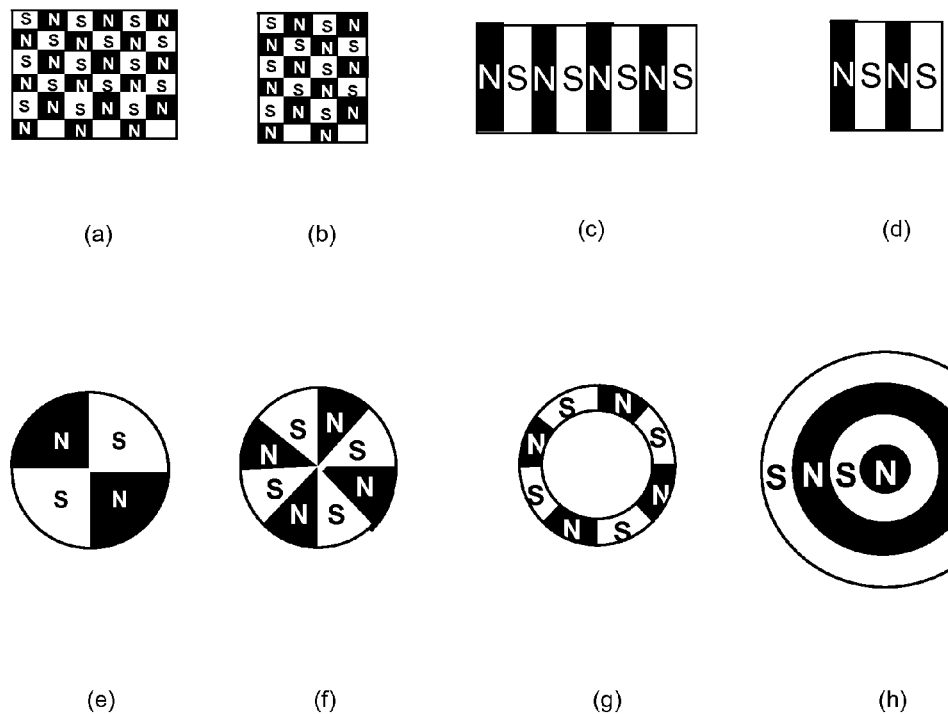
FIG. 20 shows several magnet types that are magnetized perpendicular to the magnet surface (axially), in accordance with various embodiments.

FIG. 20 shows several magnet types that are magnetized perpendicular to the magnet surface (axially), in accordance with various embodiments. For example, FIG. 20 shows (a) rectangular magnet magnetized in a checkerboard pattern, (b) square magnet magnetized in a checkerboard pattern, (c) rectangular magnet magnetized in a single direction multi-pole pattern, (d) square magnet magnetized in a single direction multi-pole pattern, (e) disc magnet magnetized into 4 sections, (f) disc magnet magnetized into 8 sections, (g) ring magnet magnetized into 8 sections, and (h) disc magnet magnetized into concentric circular sections. These patterns are shown by way of illustration and it is obvious that many types of magnets and shapes can be devised for various applications with regular or irregular shapes that have multi-pole magnetic patterns.

For applications in securing or mounting of parts to another part, a multi-pole magnet similar to magnets in FIG. 20 or another appropriate shape and size and number of poles can be devised for the device to be mounted or the mount and combined with a matching magnet or ferromagnet or other magnetically attractable material on the opposite part (device or mount) to provide attraction between the two parts. Since each magnet includes a number of poles, this approach allows both for central alignment between the two parts (i.e. their respective magnets or magnetically attractable material are centered with respect to one another); and stepped or rotational alignment between the two parts (i.e. their respective magnets or magnetically attractable material can be center-aligned with respect to one another, and then rotated around those centers in steps corresponding to the number of poles, wherein at each step the full magnetic attraction is provided). This allows for novel uses of such magnets, for example to allow parts to be attached to one another in a variety or particular number of relative orientations.

In accordance with an embodiment, in applications such as shown in FIG. 11-15, the appropriately designed magnet can be used instead of the uniformly magnetized magnets of earlier design, to provide stronger or similar attractive force while producing minimal or zero magnetic field away from the magnet not to disturb other magnetically sensitive parts or devices.

Figure 21:
FIG. 21 shows an example of various ring or arc multi-pole magnets, as may be used to with a coil to provide alignment, in accordance with an embodiment.
Figure 22:
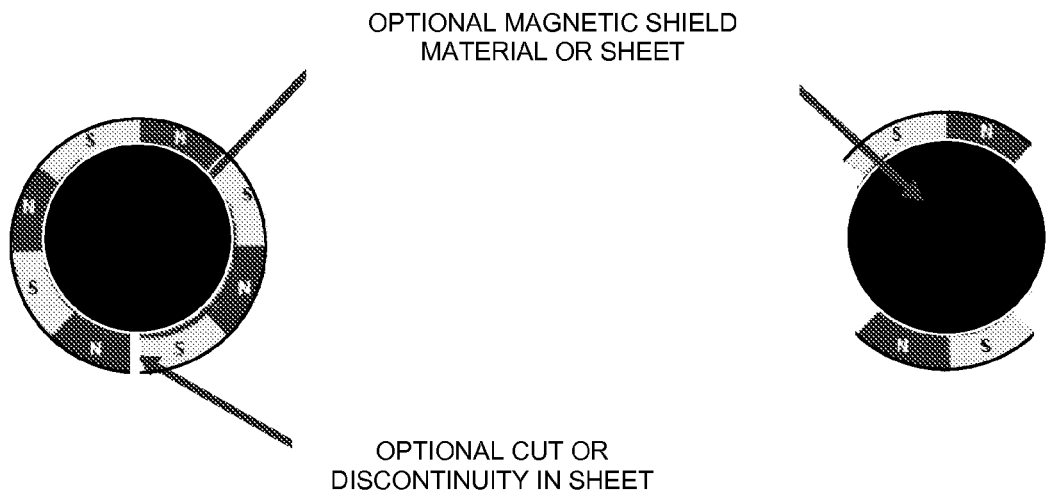
FIG. 22 illustrates a ring magnet that includes a discontinuity, in accordance with an embodiment.

As an example, in accordance with various embodiments, ring or arc multi-pole magnets such as those shown in FIG. 21 can be used with the coil to provide alignment. It will be evident that improvements such as cuts or discontinuities, etc. for reduction of eddy currents can be implemented as in singly poled magnets described for example in U.S. patent applications "INDUCTIVE POWER SOURCE AND CHARGING SYSTEM", application Ser. No. 11/669,113, filed Jan. 30, 2007 (subsequently published as U.S. Publication No. 20070182367, and issued as U.S. Pat. No. 7,952, 322); "POWER SOURCE, CHARGING SYSTEM, AND INDUCTIVE RECEIVER FOR MOBILE DEVICES", application Ser. No. 11/757,067, filed Jun. 1, 2007 (subsequently published as U.S. Publication No. 20070279002, and issued as U.S. Pat. No. 7,948,208); "SYSTEM AND METHOD FOR INDUCTIVE CHARGING OF PORTABLE DEVICES", application Ser. No. 12/116,876, filed May 7, 2008 (subsequently published as U.S. Publication No. 20090096413); and "SYSTEM AND METHODS FOR INDUCTIVE CHARGING, AND IMPROVEMENTS AND USES THEREOF"; application Ser. No. 12/769,586, filed Apr. 28, 2010 (subsequently published as U.S. Publication No. 20110050164), each of which applications are hereby incorporated by reference herein. For example, the ring magnet in FIG. 22 shows an implementation of such a discontinuity at the bottom of the figure.

While most of the description below is based on the inductive method of power transfer, the embodiments described here can be implemented with either the inductive method or the conductive method or the magnetic resonance method, optical, or other methods for power transfer some of which have been described above. Inductive methods of power transfer are described above as an example of the more general wireless power transfer.

Furthermore, the type of magnets discussed above may be used with magnetic shielding material commonly in use for reduction of AC or DC magnetic field such as mumetal, etc. available from Magnetic Shield Corporation or material such as thin flexible sheets available from Maruwa or nano materials such as Finemet from Hitachi Corp or ferromagnetic or alloys of ferromagnetic materials such as iron, nickel and cobalt. For example in the case of the inductive charger or receiver described above, the area behind a coil can be covered by a magnetic shield material and a square, rectangle, ring or arc of multi-pole magnet can be attached around and/or on such a shield and be used for attraction and alignment of the charger and receiver coil to each other. FIG. 22 shows such an arrangement where multi-pole magnets (multi-pole ring (left) and arc (right) magnet on or around an inductive coil) and magnetic shielding material are used behind a coil. Here, the magnetic shield layer or material shields behind the coil provides shielding from the alternating magnetic field of the coil. An optional cut/discontinuity in the ring (shown at the bottom of the ring magnet on the left) prevents or reduces eddy currents during operation of the inductive coil.

In addition, heat transfer layers can be incorporated to spread the heat generated. Such layers need to be designed not to interfere with the operation of the coils. Since alternating magnetic fields are generated and detected in an inductive system, use of a metal layer behind the coil would produce eddy currents and loss. One method for providing thermal conductivity with metal layers is where a metal layer with discontinuous portions is placed behind and/or around the coil. In this case, the metal layer can comprise rectangular slices that can conduct heat away from the center of a coil while, due to discontinuity between the slices, the electrons can not flow in a circular motion due to the alternating magnetic field. The pattern described here has a number of triangular slices but any other pattern which can provide heat transport but does not allow carriers to circulate in a rotational pattern due to the alternating magnetic field can be implemented.

Alternatively, multi-pole magnets can be manufactured by way of taking a single poled magnet, cutting it into appropriate sections, and reassembling the pieces and attaching them together with an adhesive, glue, or other bonding agent or other material; or alternatively a holder, etc. or clamp or screws or external force or other methods, so that the multi-pole geometry is achieved. For example, a single poled axially poled (out of plane of ring) ring can be cut into 4, 8, 16, or another number of even or odd sections, and half of the sections turned over and reassembled to provide a multi-pole magnet. To aid in assembly of such a magnet, it may be necessary to attach or place the parts on to another solid continuous piece. This piece may be magnetic, ferromagnetic, or non-magnetic itself. For example, in the ring magnet example above, the pieces of the ring magnet can be attached and reassembled in a multi-pole geometry on a stainless steel, iron, Nickel, plastic, or copper, etc. ring to aid in assembly and to hold the sections together. The properties of the backing material, its thickness, etc. can also be optimized to provide necessary performance. For example, use of a ferromagnetic material as backing can further provide a path for the magnetic flux in that section and provide further tighter coupling between sections and reduction of magnetic field away from the ring. It may also be desirable to sandwich the magnet on both sides with similar or dissimilar backing material or layers, or use multiple backing layers to further engineer symmetric or asymmetric properties on the two sides of the multi-pole magnet.

Figure 23:
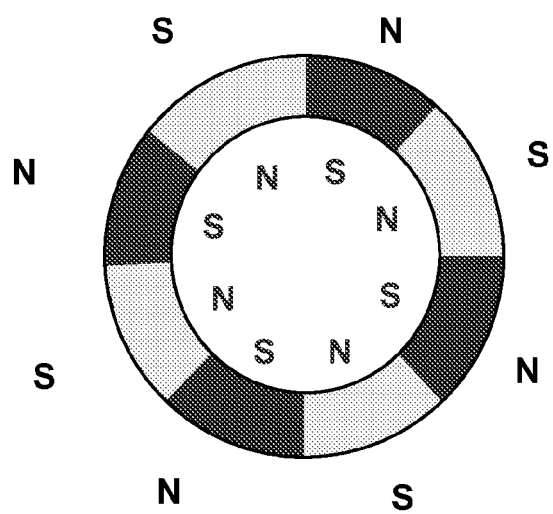
FIG. 23 illustrates a multi-pole ring magnet with radially magnetized sections, in accordance with an embodiment.

FIG. 23 shows a multi-pole ring magnet with radially magnetized sections. In use of the magnet for inductive charging applications, a cut or break in the circle or arc magnets as described earlier can be used.

While in the above description, emphasis has been given to affixing electronic parts, batteries, electric parts, etc to other parts or components or cases, holders, etc., the processes, systems, and methods described above can be similarly used to permanently or temporarily fix, attach, align, or establish relation between any two or more parts of the same or different items, products, areas, etc., including those not directly related to electronics. Examples include in lighting, furniture, automotive, mechanical instruments or machines, electronics, electrical systems and components, batteries, cases, purses, clothing, footwear, or any other number of applications. Other examples can be developed in accordance with other applications.

Some aspects of the present invention can be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing universal or improved compatibility and transfer of wireless power to mobile devices and batteries, comprising:
   a charger, including a charger coil and one or more coil drivers, microcontroller units, or other output current and/or voltage controlling components,
   wherein the charger includes a circuit or other components that measures the current through and/or voltage across the charger coil,
   wherein the coil driver, microcontroller unit, or other output current and/or voltage controlling components receives a communication signal from a detection/demodulation or communication circuit, and makes appropriate adjustments to the charger coil drive circuitry to achieve a desired voltage, current or power at a receiver output, for using in powering or charging a mobile device and/or battery, and
   wherein the charger and the receiver initiate communication using a ping process which includes that
      the charger pings at a ping frequency associated with its charger type, and
      the receiver determines the ping frequency of the charger and uses such information to
         determine the charger type, wherein different charger types are associated with different charging protocols,
         select, from within the different charging protocols, a particular charging protocol to be used with the charger according to its charger type, and
         communicate with the charger, using the particular charging protocol, to power or charge the mobile device and/or battery, including communicating information to the charger for its use in
            determining the receiver type, wherein different receiver types are associated with different charging protocols, and
      making the appropriate adjustments to the charger coil drive circuitry to achieve the desired voltage, current or power at the receiver output.

2. The system of claim 1, wherein the charger is used with the mobile device and/or battery having the receiver that is coupled to a receiver coil and a receiver circuit and that includes a capacitor in parallel or series with the receiver coil to produce a tuned receiver circuit.

3. The system of claim 1, wherein the mobile device and/or battery includes the receiver that further includes a receiver microcontroller that is used to measure various values including one or more of output voltage, current, temperature, state of charge, battery full status, or end of charge, and to report those values back to the charger to provide a closed loop system with the charger.

4. The system of claim 1, wherein communication between the charger and receiver is provided through one or more of the charger and receiver coils used for power transfer or an antenna, or through a separate coil, radio frequency link, optical communication system, and wherein the communication using any of these methods can be bi-directional and/or uni-directional.

5. The system of claim 1, wherein the charger and the receiver communicate to provide optimal charging information, including that
   the charger periodically activates the charger coil with a drive signal of appropriate frequency, during which ping process, if a receiver coil is placed on top or close to the charger coil, power is received through the receiver coil and the receiver circuit is energized, and
   wherein a receiver microcontroller is activated by the received power and performs an initiation process whereby one or more of the receiver ID, its presence, power or voltage requirements, receiver or battery temperature, state of charge or other information is sent back to the charger.

6. A method for providing universal or improved compatibility and transfer of wireless power to mobile devices and batteries, comprising the steps of:
   providing a charger including a charger coil and one or more coil drivers, microcontroller units, or other output current and/or voltage controlling components,
   wherein the charger includes a circuit or other components that measures the current through and/or voltage across the charger coil,
   wherein the coil driver, microcontroller unit, or other output current and/or voltage controlling components receives a communication signal from a detection/demodulation or communication circuit, and makes appropriate adjustments to the charger coil drive circuitry to achieve a desired voltage, current or power at a receiver output, for using in powering or charging a mobile device and/or battery, and
   wherein the charger and the receiver initiate communication using a ping process which includes that
      the charger pings at a ping frequency associated with its charger type, and
      the receiver determines the ping frequency of the charger and uses such information to
         determine the charger type, wherein different charger types are associated with different charging protocols,
         select, from within the different charging protocols, a particular charging protocol to be used with the charger according to its charger type, and
         communicate with the charger, using the particular charging protocol, to power or charge the mobile device and/or battery, including communicating information to the charger for its use in
            determining the receiver type, wherein different receiver types are associated with different charging protocols, and
      making the appropriate adjustments to the charger coil drive circuitry to achieve the desired voltage, current or power at the receiver output.

7. The method of claim 6, wherein the charger is used with the mobile device and/or battery having the receiver that is coupled to a receiver coil and a receiver circuit and that includes a capacitor in parallel or series with the receiver coil to produce a tuned receiver circuit.

8. The method of claim 6, wherein the mobile device and/or battery includes the receiver that further includes a receiver microcontroller that is used to measure various values including one or more of output voltage, current, temperature, state of charge, battery full status, or end of charge, and to report those values back to the charger to provide a closed loop system with the charger.

9. The method of claim 6, wherein communication between the charger and receiver is provided through the charger and receiver coils used for power transfer or an antenna, or through a separate coil, radio frequency link, optical communication system, or combination of these methods, and wherein the communication using any of these methods can be bi-directional and/or uni-directional.

10. The method of claim 6, wherein the charger and the receiver communicate to provide optimal charging information, including that
the charger periodically activates the charger coil with a drive signal of appropriate frequency, during which ping process, if a receiver coil is placed on top or close to the charger coil, power is received through the receiver coil and the receiver circuit is energized, and
wherein a receiver microcontroller is activated by the received power and performs an initiation process whereby one or more of the receiver ID, its presence, power or voltage requirements, receiver or battery temperature, state of charge or other information is sent back to the charger.

11. The system of claim 1, wherein the charger and the receiver communicate through a pre-determined protocol that establishes one or more of a communication encoding or modulation, modulation depth, hand-shake, establishment of communication and signaling, or closed loop control and regulation of power, voltage or current in the receiver.

12. The system of claim 1, wherein the charger is a multi-protocol charger that can interoperate with receivers according to two or more different communication protocols and/or frequencies of operation.

13. The system of claim 1, wherein the charger determines a communication protocol and/or frequency of operation of a receiver by pinging at different frequencies.

14. The system of claim 1, wherein the charger and the receiver communicate through a protocol that includes modulating the receiver load which is then detected by the charger.

15. The system of claim 1, wherein the charger and the receiver form a closed loop to control and regulate the receiver output power and/or wherein the receiver regulates its output power using a regulator or charger circuit.

16. The system of claim 1, wherein the receiver is a multi-protocol receiver that can interoperate with chargers according to two or more different communication protocols and/or frequencies of operation.

17. The system of claim 1, wherein the charger and the receiver communicate through a pre-determined protocol, and wherein the receiver determines the communication protocol and/or frequency of operation of the charger by determining the ping frequency of the charger.

18. The system of claim 1, wherein the charger is provided within a vehicle, for charging the mobile device and/or battery.

19. The system of claim 1, wherein the mobile device is a vehicle, and wherein the vehicle includes the receiver that enables the vehicle or its battery to be charged by the charger.

20. The method of claim 6, wherein the charger and the receiver communicate through a pre-determined protocol that establishes one or more of a communication method and/or communication encoding or modulation, modulation depth, method of hand-shake, establishment of communication and signaling, or method of closed loop control and regulation of power, voltage or current in the receiver.

21. The method of claim 6, wherein the charger is a multi-protocol charger that can interoperate with receivers according to two or more different communication methods, protocols and/or frequencies of operation.

22. The method of claim 6, wherein the charger determines a communication method, protocol and/or frequency of operation of a receiver by pinging at different frequencies.

23. The method of claim 6, wherein the charger and the receiver communicate through a protocol that establishes a communication method, and wherein the communication method includes modulating the receiver load which is then detected by the charger.

24. The method of claim 6, wherein the charger and the receiver form a closed loop to control and regulate the receiver output power and/or wherein the receiver regulates its output power using a regulator or charger circuit.

25. The method of claim 6, wherein the receiver is a multi-protocol receiver that can interoperate with chargers according to two or more different communication methods, protocols and/or frequencies of operation.

26. The method of claim 6, wherein the charger and the receiver communicate through a pre-determined protocol, and wherein the receiver determines the communication method, protocol and/or frequency of operation of the charger by determining the ping frequency of the charger.

27. The method of claim 6, wherein the charger is provided within a vehicle, for charging the mobile device and/or battery.

28. The method of claim 6, wherein the mobile device is a vehicle, and wherein the vehicle includes the receiver that enables the vehicle or its battery to be charged by the charger.

* * * * *